(12) United States Patent
Setoguchi et al.

(10) Patent No.: US 8,600,918 B2
(45) Date of Patent: Dec. 3, 2013

(54) ACTION HISTORY SEARCH DEVICE

(75) Inventors: Hisao Setoguchi, Kawasaki (JP); Yuzo Okamoto, Yokohama (JP); Kenta Cho, Kawasaki (JP); Takahiro Kawamura, Ohta-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 13/233,424

(22) Filed: Sep. 15, 2011

(65) Prior Publication Data

US 2012/0150777 A1    Jun. 14, 2012

(30) Foreign Application Priority Data

Dec. 13, 2010    (JP) .................................. 2010-277368

(51) Int. Cl.
- *G06F 15/18* (2006.01)
- *G06F 17/00* (2006.01)
- *G06N 99/00* (2010.01)

(52) U.S. Cl.
CPC ..................................... *G06N 99/005* (2013.01)
USPC ...................... 706/14; 706/1; 706/15; 706/45

(58) Field of Classification Search
None
See application file for complete search history.

(56) References Cited

U.S. PATENT DOCUMENTS 7,640,164 B2 *    12/2009    Sasaki et al. .................. 704/272

FOREIGN PATENT DOCUMENTS

| JP | 2004-272355 | 9/2004 |
|----|-------------|--------|
| JP | 2004-320217 | 11/2004 |
| JP | 2005-56022  | 3/2005 |
| JP | 2006-268690 | 10/2006 |
| JP | 2007-011674 | 1/2007 |
| JP | 2008-27364  | 2/2008 |
| JP | 2008-301290 | 12/2008 |
| JP | 2009-139129 | 6/2009 |
| JP | 2010-217976 | 9/2010 |
| WO | 2010/073961 | 7/2010 |
| WO | 2011/013245 | 2/2011 |

* cited by examiner

*Primary Examiner* — Alan Chen

(74) *Attorney, Agent, or Firm* — Nixon & Vanderhye, P.C.

(57) ABSTRACT

According to one embodiment, an action history search device receives an inquiry from a user and outputs a inquiry time and a target of inquiry, decides a range for searching action history information representing history of the user's action together with a time of the user's action using the target of inquiry, and calculates an elapsed time from the time of the user's action within the range to the inquiry time. The device judges using the elapsed time and a narrowing-down model a probability on each response candidate to the inquiry based on the history of the action within the range. The narrowing-down model is used for judging according to the elapsed time the probability that the response candidate to the inquiry obtained from the history of the action is the user's desired response. The device outputs the response candidate according to the probability.

10 Claims, 23 Drawing Sheets

FIG.3

| BASIC INFORMATION | START TIME | (DATE + TIME) |
|---|---|---|
| | END TIME | (DATE + TIME) |
| | CONTENT OF ACTION (TYPE) | (CHARACTER STRING) |

| ADDITIONAL INFORMATION | POSITION | (LATITUDE, LONGITUDE (NUMERICAL VALUE)) |
|---|---|---|
| | NAME OF ADJACENT PERSON | (CHARACTER STRING) |
| | EVENT NAME | (CHARACTER STRING) |

FIG.4

| START DATE | DAY OF WEEK | START TIME | END DATE | DAY OF WEEK | END TIME | EVENT NAME | PLACE | REMARK |
|---|---|---|---|---|---|---|---|---|
| (DATE) | (CHARACTER STRING) | (TIME) | (DATE) | (CHARACTER STRING) | (TIME) | (CHARACTER STRING) | (CHARACTER STRING) | (CHARACTER STRING) |

FIG.7

| KEYWORD | INQUIRY TARGET |
|---|---|
| REFERENCE TERM + "WHO" | PERSONAL NAME |
| REFERENCE TERM + "WHAT" | NAME OF OBJECT |
| "WHERE" | PLACE |
| "HOW" + "DO" | METHOD |
| REFERENCE TERM + "WHEN" | TIME |
| "HOW" + "GO" | ROUTE TO PLACE |
| ⋮ | |

FIG.8

| INQUIRY TARGET | PERSONAL NAME |
|---|---|
| INQUIRY TIME | 2010-08-24 13:27:15 |

| ELAPSED TIME | (FLOATING-POINT VALUE) |
|---|---|
| NUMBER OF MEETING TIMES | (INTEGER VALUE) |
| NUMBER OF EVENT SHARING TIMES | (INTEGER VALUE) |
| NUMBER OF EVENT SHARING TIMES/NUMBER OF MEETING TIMES | (FLOATING-POINT VALUE) |

FIG.19

| BASIC INFORMATION | |
|---|---|
| NAME | TONO SHIBATARO |
| BIRTH DATE | 1962-08-12 |
| SEX | MALE |
| NATIONALITY | JAPAN |
| LEGAL DOMICILE | 1-1-1 SHIBAURA, MINATO-KU, TOKYO |
| MOTHER LANGUAGE | JAPANESE |

| | BACKGROUND |
|---|---|
| ... | ... |
| 1975-04-07 | ENTERED INTO OO JUNIOR HIGH SCHOOL |
| 1978-03-18 | GRADUATED FROM OO JUNIOR HIGH SCHOOL |
| 1978-04-07 | ENTERED INTO × × HIGH SCHOOL |
| 1981-03-01 | GRADUATED FROM × × HIGH SCHOOL |
| 1981-04-07 | ENTERED INTO ▽▽ UNIVERSITY |
| 1985-03-10 | GRADUATED FROM ▽▽ UNIVERSITY |
| 1985-04-01 | JOINED OO COMPANY |
| 1989-06-03 | MARRIAGE |
| 1991-07-19 | HAD FIRST SON |
| ... | ... |

| ADDITIONAL INFORMATION | |
|---|---|
| PRESENT ADDRESS | 2-1, TOWN, FUCHU-SHI, TOKYO |
| ORGANIZATION | OO COMPANY |
| HOBBY | BICYCLE |
| FAMILY MEMBER | WIFE, OLDEST SON, OLDEST DAUGHTER, SECOND SON |
| ... | ... |

FIG.21

| SCHEDULE | | | | | | | | | |
|---|---|---|---|---|---|---|---|---|---|
| START DATE | DAY OF WEEK | START TIME | END DATE | DAY OF WEEK | END TIME | EVENT NAME | PLACE | REMARK |
| 2010-08-27 | FRIDAY | 10:00 | 2010-08-27 | FRIDAY | 20:00 | BUSINESS TRIP | ODAIBA | |
| 2010-08-28 | SATURDAY | 19:00 | 2010-08-28 | SATURDAY | 21:00 | ×× HIGH SCHOOL REUNION | ○○ RESTAURANT | |
| 2010-08-30 | MONDAY | 15:00 | 2010-08-30 | MONDAY | 17:00 | MEETING | COMPANY | PREPARING FOR MATERIALS |
| ... | ... | ... | ... | ... | ... | ... | ... | ... | ns of US 8,600,918 B2

ACTION HISTORY SEARCH DEVICE

CROSS-REFERENCE TO RELATED APPLICATIONS

This application is based upon and claims the benefit of priority from Japanese Patent Application No. 2010-277368, filed on Dec. 13, 2010; the entire contents of which are incorporated herein by reference.

FIELD

Embodiments described herein relate generally to an action history search device.

BACKGROUND

Conventionally, there have been techniques of judging a user's state inside a facility using a sensor installed in the facility and automatically activating a device expected to be used in the user's state. Of these techniques, there is an information processing system that accumulates action history information representing a user's action together with a time. The system receives an inquiry from the user, analyzes the content of the inquiry, and narrows down action history information, which is appropriate as a response to the inquiry, based on a keyword included in the inquiry. For example, in a technique disclosed in JP-A No. 2007-011674 (KOKAI), a conversational robot receives from a user an inquiry that includes a keyword designating specific timing, for example, "why did you turn on the television this morning?" inquiring the reason for having activated a device. The conversational robot, which is an information processing system, analyzes the content of the inquiry, narrows down a range of user's action history information based on the facility to refer, and provides a response, for example, "because you took a seat in front of the television this morning" based on the action history information.

BRIEF DESCRIPTION OF THE DRAWINGS

FIG. 3 is a diagram illustrating a data configuration of action history information;
FIG. 4 is a diagram illustrating a data configuration of schedule information;
FIG. 7 is a diagram illustrating a correspondence relation between a morpheme and a target of inquiry;
FIG. 8 is a diagram illustrating a target of inquiry and an inquiry time;
FIG. 19 is a diagram illustrating a data configuration of user profile information;
FIG. 21 is a diagram illustrating a data example of schedule information.

DETAILED DESCRIPTION

In general, according to one embodiment, an action history search device receives an inquiry from a user and outputs a inquiry time at which the inquiry is received and a target of inquiry, decides a range for searching action history information representing history of the user's action together with a time of the user's action using the target of inquiry, and calculates an elapsed time from the time of the user's action represented by the action history information within the range to the inquiry time. The device judges using the elapsed time and a narrowing-down model a probability on each response candidate to the inquiry based on the history of the action represented by the action history information within the range. The narrowing-down model is used for judging according to the elapsed time the probability that the response candidate to the inquiry obtained from the history of the action represented by the action history information is the user's desired response. The device outputs the response candidate according to the probability.

First Embodiment

Figure 1:
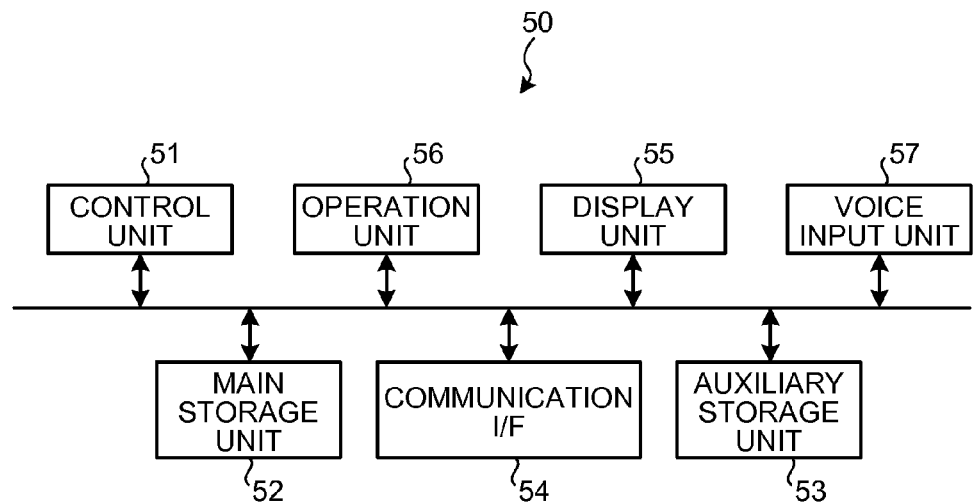
FIG. 1 is a diagram illustrating a hardware configuration of an action history search device according to a first embodiment.

First, a hardware configuration of an action history search device according to the present embodiment will be described with reference to FIG. 1. An action history search device 50 includes a control unit 51 such as a CPU (central processing unit) that controls the whole device, a main storage unit 52 such as a ROM (read only memory) or a RAM (random access memory) that stores a variety of data or a variety of programs, an auxiliary storage unit 53 such as a HDD (hard disk drive) or a CD (compact disk) drive device that stores a variety of data or a variety of programs, and a bus that connects the above-mentioned components with one another. The action history search device 50 has a hardware configuration that employs a typical computer. The CPU has a time measuring function of measuring a time. Furthermore, the action history search device 50 is connected with a communication I/F (interface) 54 that controls communication with an external device, a display unit 55 that displays information, an operation unit 56 such as a keyboard or a mouse that receives a user's instruction input, and a voice input unit 57 such as a microphone to which voice is input in a wire-line manner or a wireless manner. For example, the action history search device 50 is a mobile-phone unit and used by an individual user.

Figure 2:
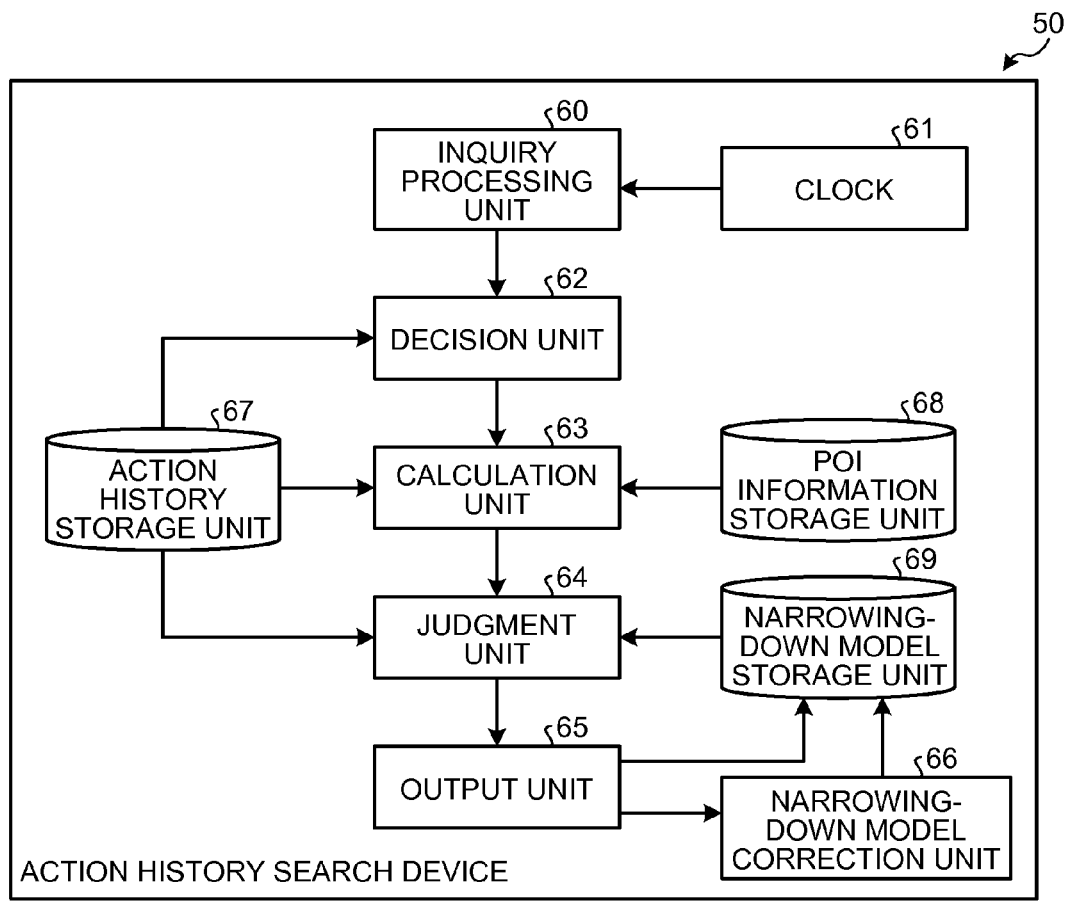
FIG. 2 is a diagram illustrating a functional configuration of an action history search device.

A functional configuration of the action history search device 50 having the above hardware configuration will be described with reference to FIG. 2. The action history search device 50 includes an inquiry processing unit 60, a clock 61, a decision unit 62, a calculation unit 63, a judgment unit 64, an output unit 65, a narrowing-down model correction unit 66, an action history storage unit 67, a POI (points of interest) information storage unit 68, and a narrowing-down model storage unit 69. The clock 61 is implemented by a time measuring function of the CPU in the action history search device 50. The inquiry processing unit 60, the clock 61, the decision unit 62, the calculation unit 63, the judgment unit 64, the output unit 65, and the narrowing-down model correction unit 66 are implemented, respectively, by executing various programs stored in the main storage unit 52 or the auxiliary storage unit 53 through the CPU of the action history search device 50. Each of the action history storage unit 67, the POI information storage unit 68, and the narrowing-down model storage unit 69 is a storage area secured in the auxiliary storage unit 53.

The action history storage unit 67 stores action history information representing history of the user's action together with a time. Here, it is assumed that action history information related to the individual user of the action history search device 50 is stored. FIG. 3 is a diagram illustrating a data configuration of the action history information. As illustrated in FIG. 3, the action history information represents a start time and an end time of an action, an action content, a place where an action occurs (position), a name of an adjacent person (personal name), and a name of an event related to an action (event name). The place where an action occurs may be represented, for example, by the latitude and the longitude. In this case, the place where an action occurs may be acquired by a GPS (global positioning system) function, a Bluetooth function, or various sensors mounted in a mobile device carried by the user or may be acquired from a base station. Furthermore, image data representing an image of a face of a corresponding person or the like may be included in the action history information in association with a name of an adjacent person or may be stored in the auxiliary storage unit 53 separately from the action history information. The action history information may be generated using schedule information, which is generated by the user inputting his/her action schedule, and stored in the action history storage unit 67. FIG. 4 is a diagram illustrating a data configuration of the schedule information. The schedule information represents the user's action schedule together with a date, a time, and a place. Specifically, the schedule information represents a start date, a day of the week, a start time, an end date, a day of the week, an end time, an event name, and a place name in relation to an action schedule. The schedule information may represent a remark. For example, the remark may be a precaution, an accompanying person, or the number of accompanying persons. The schedule information itself may be stored in the auxiliary storage unit 53.

The POI information storage unit 68 stores POI information. The POI information represents the place name in association with the latitude and the longitude. The narrowing-down model storage unit 69 is adapted for the individual user of the action history search device 50 and stores a narrowing-down model that is used for judging, based on an elapsed time which will be described later, a probability (referred to as "inquiry probability") that a candidate of a response (referred to as "response candidate") to an inquiry obtained from history of the action represented by the action history information on the user's inquiry is the user's desired response. The details of the narrowing-down model will be described together with an operation which will be described later.

The clock 61 measures a time. The inquiry processing unit 60 receives an inquiry from the user; acquires a time, at which the inquiry has been received (referred to as "inquiry time"), from the clock 61; judges a target of inquiry by analyzing the content of the inquiry; and outputs the target of inquiry and the inquiry time.

An interface used by the inquiry processing unit 60 for receiving the inquiry from the user is not particularly limited. For example, when the user utters voice representing an inquiry, the inquiry processing unit 60 may judge the target of inquiry by analyzing the voice input to the voice input unit 57 through voice recognition. Furthermore, the inquiry processing unit 60 may display an inquiry screen, which is an interface for receiving the inquiry from the user, on the display unit 55 in the menu form and may have the user perform an operation input for selecting an item which is the target of inquiry from a menu on the inquiry screen through the operation unit 56. In this case, the inquiry processing unit 60 may determine the target of inquiry in response to the operation input.

The decision unit 62 decides a range of action history information as a search target using the target of inquiry output from the inquiry processing unit 60 so that action history information to be searched, which is stored in the action history storage unit 67, is limited to information that is associated with the target of inquiry; and outputs search range information representing the decided range together with the inquiry time.

The calculation unit 63 analyzes action history information within the range represented by the search range information using the inquiry time and the search range information output from the decision unit 62; calculates statistics of an elapsed time and the frequency related to an action; and generates action history statistics information representing the statistical result. Furthermore, the calculation unit 63 determines a place name corresponding to the latitude and the longitude of the position represented by the action history information using the POI information stored in the POI information storage unit 68; and outputs place name information representing the place name and the action history statistics information as the analysis result.

The judgment unit 64 judges the user's inquiry probability for the response candidate to the inquiry using the action history statistics information output from the calculation unit 63 and the narrowing-down model stored in the narrowing-down model storage unit 69. The judgment unit 64 outputs search result information representing the response candidate having a high inquiry probability as a search result. An output condition as to a degree of the inquiry probability for outputting the response candidate as the search result may be set in advance by the user. For example, the output condition may be set such that response candidates other than a response candidate having low inquiry probability may be output as the search result, or only response candidates having high inquiry probability may be output as the search result.

The output unit 65 outputs to the user the response candidate information concerning the response to the inquiry, which is received by the inquiry processing unit 60, using the search result information output from the judgment unit 64 and the analysis result output from the calculation unit 63.

The narrowing-down model correction unit 66 corrects the narrowing-down model stored in the narrowing-down model storage unit 69 in response to the user's operation input performed through the operation unit 56, which is performed for the response output from the output unit 65.

Next, a procedure of an action history search process performed by the action history search device 50 according to the present embodiment will be described with reference to FIG. 5. In step S1, when an inquiry is received from a user, the action history search device 50 performs inquiry processing through the function of the inquiry processing unit 60. Then, in step S2, the action history search device 50 outputs a time at which the inquiry is received (inquiry time) and the target of inquiry (inquiry target).

Figure 6:
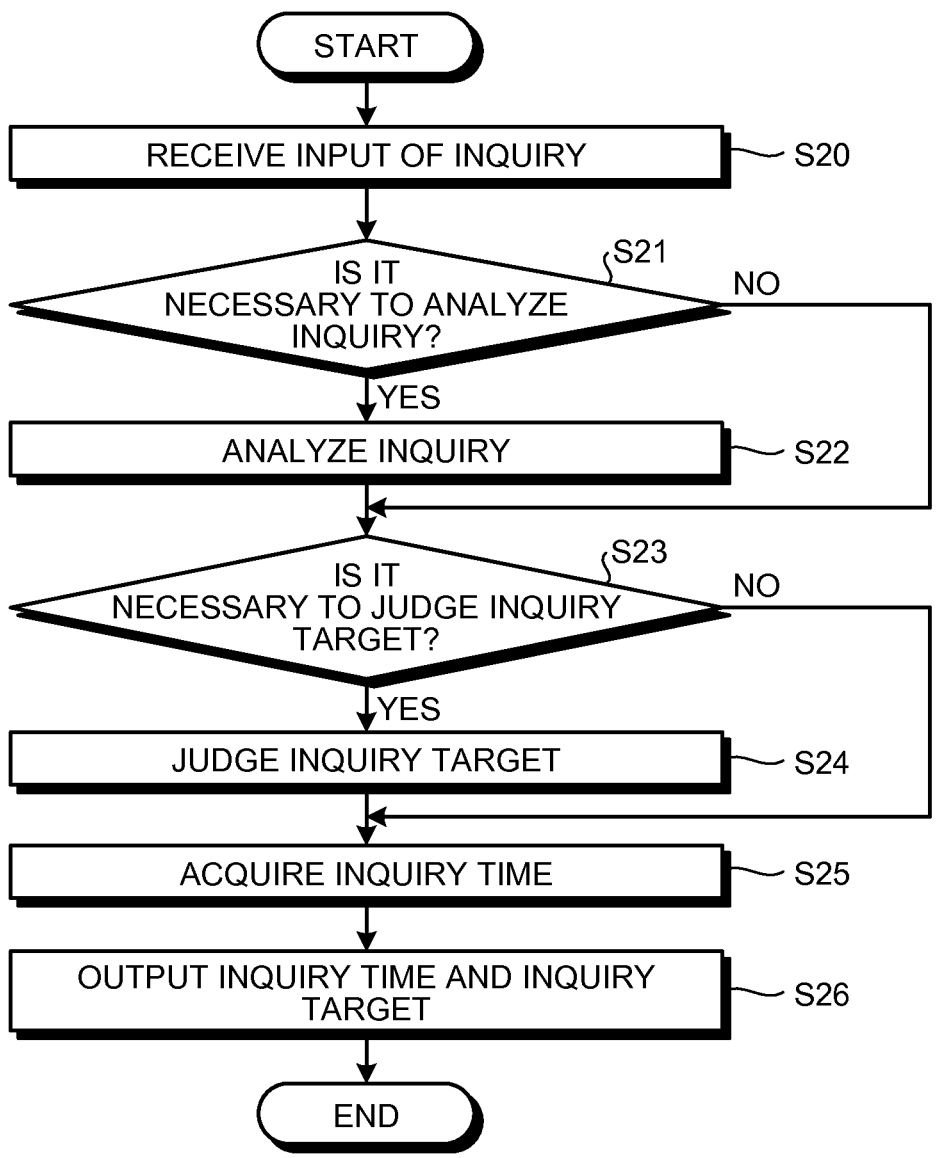
FIG. 6 is a flowchart illustrating a procedure of detailed processing of step S1 and step S2 of FIG. 5.

A procedure of detailed processing of step S1 and step S2 will be described with reference to FIG. 6. In step S20, the inquiry processing unit 60 receives the inquiry from the user. In step S21, the inquiry processing unit 60 judges whether or not it is necessary to analyze the inquiry. When it is judged that it is not necessary to analyze the inquiry (No in step S21), the process proceeds to step S23. When it is judged that it is necessary to analyze the inquiry (Yes in step S21), in step S22, the inquiry processing unit 60 analyzes the inquiry, and the process proceeds to step S23. In step S23, the inquiry processing unit 60 judges whether or not it is necessary to judge the target of inquiry (inquiry target). When it is judged that it is not necessary to judge the inquiry target (No in step S23), the process proceeds to step S25. When it is judged that it is necessary to judge the inquiry target (Yes in step S23), in step S24, the inquiry processing unit 60 judges the inquiry target, and the process proceeds to step S25. In step S25, the inquiry processing unit 60 acquires the inquiry time from the clock 61. Then, in step S26, the inquiry processing unit 60 outputs the inquiry time and the inquiry target judged in step S24.

Here, a description will be made in connection with a specific example of a method of analyzing the inquiry and judging the target of inquiry. For example, when an inquiry is input to the voice input unit 57 by voice from a user, the inquiry processing unit 60 receives the inquiry in step S20; judges that it is necessary to analyze the inquiry in step S21; and analyzes the inquiry by converting the content of the inquiry into a text through voice recognition and decomposing the content into morpheme strings by morphological analysis in step S22. In step S23, the inquiry processing unit 60 judges that it is necessary to judge the target of inquiry. In step S24, the inquiry processing unit 60 judges the target of inquiry by detecting a morpheme or a combination of morphemes which is included in the morpheme string and can be used to determine the target of inquiry based on a correspondence relation between a morpheme and the target of inquiry illustrated in FIG. 7. For example, target of inquiry correspondence information representing the correspondence relation is stored in the auxiliary storage unit 53 in advance. For example, when an inquiry stating "who is the person?" is input, a morpheme string including a morpheme "who" is detected from among morpheme strings obtained by performing the morphological analysis on the content of the inquiry; and it is judged that the target of inquiry is a "personal name" according to the correspondence relation illustrated in FIG. 7. FIG. 8 is a diagram illustrating the target of inquiry and the inquiry time output from the inquiry processing unit 60. In FIG. 8, it can be seen that the target of inquiry (inquiry target) is "personal name," and the inquiry time is "Aug. 24, 2010 13:27:15."

Figures 9, 10:
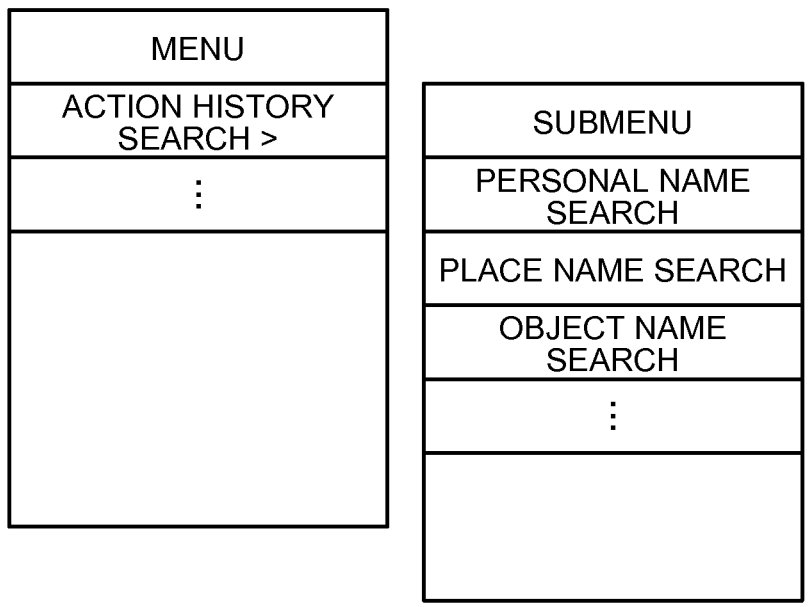
FIG. 9 is a diagram illustrating an inquiry screen of a menu form.
FIG. 10 is a diagram illustrating a data configuration of action history statistics information.

When an operation input of selecting a menu "action history search" in an inquiry screen of a menu form illustrated in FIG. 9 is performed through the operation unit 56, the inquiry processing unit 60 receives the operation input in step S20 and judges that it is not necessary to analyze the inquiry in step S21. Next, the inquiry processing unit 60 displays a sub menu on the display unit 55. Then, when an operation input of selecting "personal name" is performed in the sub menu, in step S23, the inquiry processing unit 60 judges that it is not necessary to judge the target of inquiry and judges that the target of inquiry is "personal name" in response to the operation input without analyzing the target of inquiry.

Figure 5:
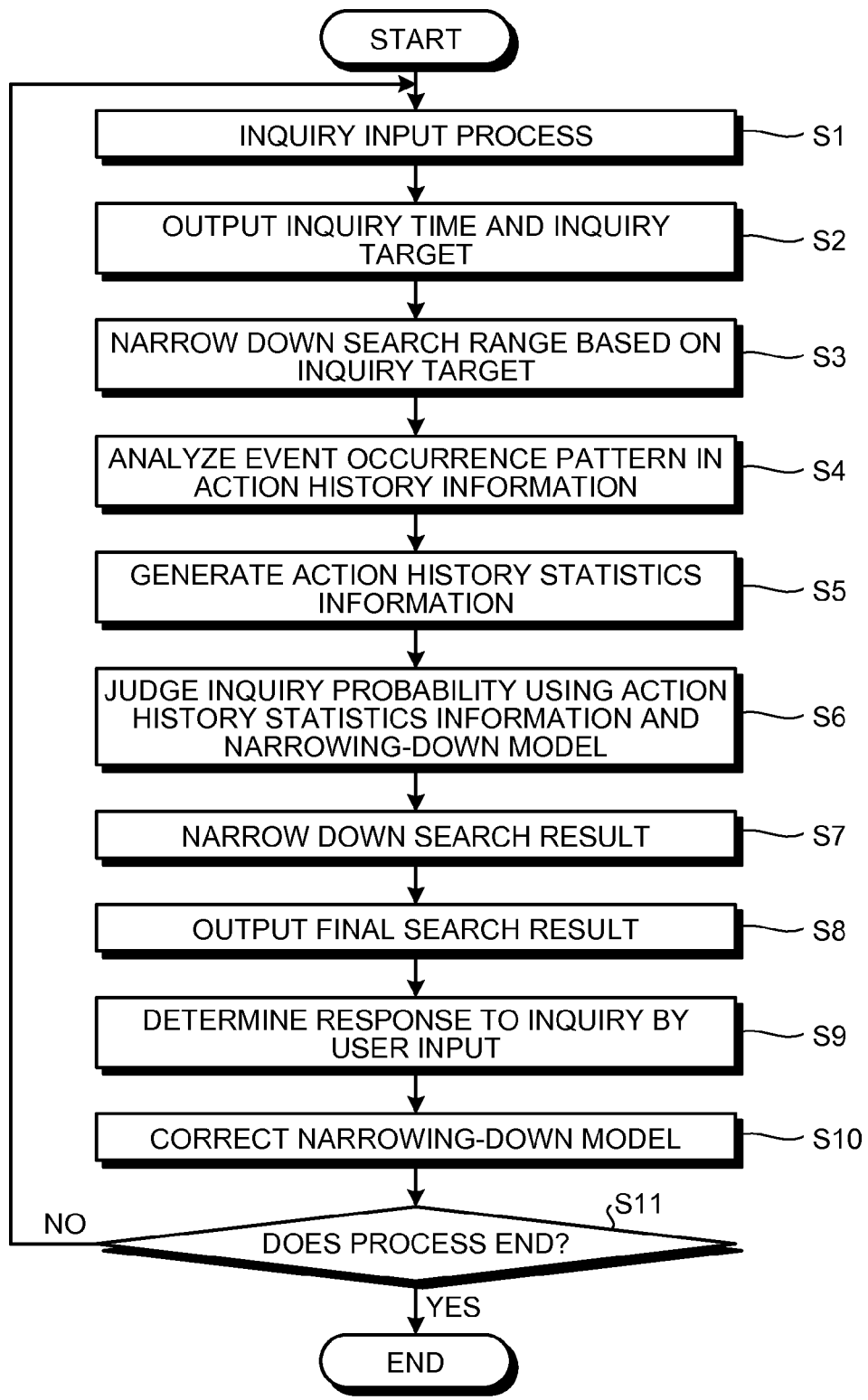
FIG. 5 is a flowchart illustrating a procedure of an action history search process.

Returning to the description of FIG. 5, in step S3, through the function of the decision unit 62, the action history search device 50 decides, using the target of inquiry output in step S2, the type of action represented by the action history information in order to set the range of the action history information to be searched from among action history information stored in the action history storage unit 67. Then, the action history search device 50 outputs the search range information representing the decided type together with the inquiry time output in step S2. For example, when the target of inquiry output in step S2 is "personal name," information to search is information that indicates "met with whom and when." Thus, the action history search device 50 outputs search range information representing action history information, in which history of an action of a type "meet" is included, as the search target together with the inquiry time.

In step S4, through the function of the calculation unit 63, the action history search device 50 analyzes the action history information representing the history of the action of the type, which is represented by the search range information output in step S3, and calculates statistics of the elapsed time and the frequency related to the action. In step S5, the action history search device 50 generates action history statistics information representing the statistical result. For example, when the target of inquiry output in step S2 is "personal name," a personal name represented by each piece of action history statistics information is obtained as the response candidate. As illustrated in FIG. 10, by calculating the elapsed time, the number of meeting times, the number of event sharing times, a ratio of the number of event sharing times to the number of meeting times, respectively, for each personal name, statistics of each personal name is obtained, and action history statistics information representing the statistical result is generated. The elapsed time refers to a time calculated as a time between either one of a start time or an end time, which is represented by the action history information of the search target representing the history of the action "meet," and the inquiry time. It this embodiment, when plural pieces of action history information are present on one personal name in the search target, the elapsed time is calculated using action history information that has the most recent start/end time in the pieces of action history information. The number of meeting times represents the frequency at which the action "meet" occurs and corresponds to the number of pieces of action history information that represent the history of the action "meet" and have different start/end times. The number of event sharing times refers to the frequency at which the action "meet" is shared as an event. Specifically, when a time between the start time and the end time represented by the action history information representing the history of the action "meet" (a time between meeting and leaving) is equal to or more than a certain time (for example, 60 minutes) and a place represented by the action history information is the same, it is regarded that an event is shared; and this number of times refers to the number of event sharing times. For example, when the same course is taken in a university, sharing of an event is defined on the basis of the assumption that there is a certain amount of time between meeting and leaving. By calculating the ratio of the number of event sharing times to the number of meeting times, expressed is a degree in which activity has been commonly performed between the user and a person having the personal name represented by the action history information on the history of the action "meet."

The action history search device 50 specifies a place name, which corresponds to the latitude and the longitude of the position represented by the action history information used for generation of the action history statistics information, using the POI information stored in the POI information storage unit 68; and outputs place name information representing the place name and the action history statistics information as the analysis result. The action history information specifying the place name may include all of pieces of action history information used for generation of the action history statistics information or may include some pieces of action history information such as action history information used for calculation of the elapsed time.

Returning to the description of FIG. 5, in step S6, through the function of the judgment unit 64, the action history search device 50 judges the user's inquiry probability on the response candidate to the inquiry using the action history statistics information output in step S5 and the narrowing-down model stored in the narrowing-down model storage unit 69.

An overview of a judgment of the user's inquiry probability using the narrowing-down model on the action history statistics information when the target of inquiry is "personal name" will be described with reference to FIG. 11. In this case, the judgment unit 64 obtains each personal name represented by each action history statistics information as the response candidate as described above. The narrowing-down model represents threshold values for sorting the level of the user's inquiry probability on the elapsed time, the number of meeting times, the number of event sharing times, and the ratio of the number of event sharing times to the number of meeting times, respectively, represented by the action history statistics information. For example, as for the elapsed time, a predetermined time (for example, 7 days) is set as a threshold value; as for the number of meeting times, a predetermined number of times (for example, three times) is set as a threshold value; as for the ratio of the number of event sharing times to the number of meeting times, a predetermined ratio (for example, 0.5) is set as a threshold value. Using the narrowing-down model representing these threshold values, for each personal name, the judgment unit 64 judges a magnitude relation between the elapsed time represented by the action history statistics information output from the calculation unit 63 and a predetermined time represented by the narrowing-down model; judges a magnitude relation between the number of meeting times represented by the action history statistics information and a predetermined number of times represented by the narrowing-down model; and judging a magnitude relation between the ratio of the number of event sharing times to the number of meeting times represented by the action history statistics information and a predetermined ratio represented by the narrowing-down model, thereby evaluating the magnitude of the value of each of the elapsed time, the number of meeting times, the number of event sharing times, and the ratio of the number of event sharing times to the number of meeting times. The level of the user's inquiry probability is judged based on these evaluations.

Figure 11:
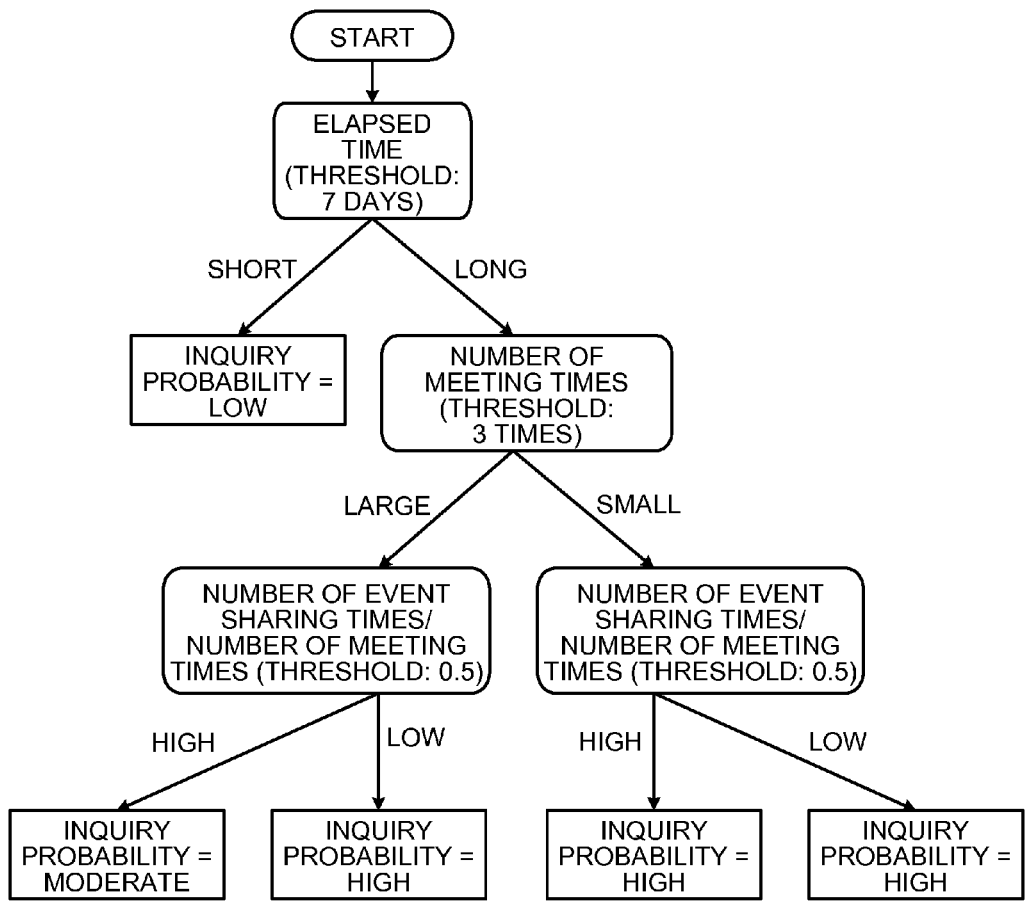
FIG. 11 is a diagram explaining an overview of a judgment of a user's inquiry probability using a narrowing-down model.

An example of FIG. 11 represents that when the elapsed time is shorter than seven days, the elapsed time is short; when the elapsed time is seven days or more, the elapsed time is long; when the number of meeting times is three times or more, the number of meeting times is large; and when the ratio of the number of event sharing times to the number of meeting times is "0.5" or more, meeting at the same place while conducting the same action is frequent, and familiarity is higher. That is, it is expected that as the ratio of the number of event sharing times to the number of meeting times increases, a person which has had many opportunities to conduct the same activity at the same place; and a probability of forgetting the person is expected to be reduced.

Figure 12:
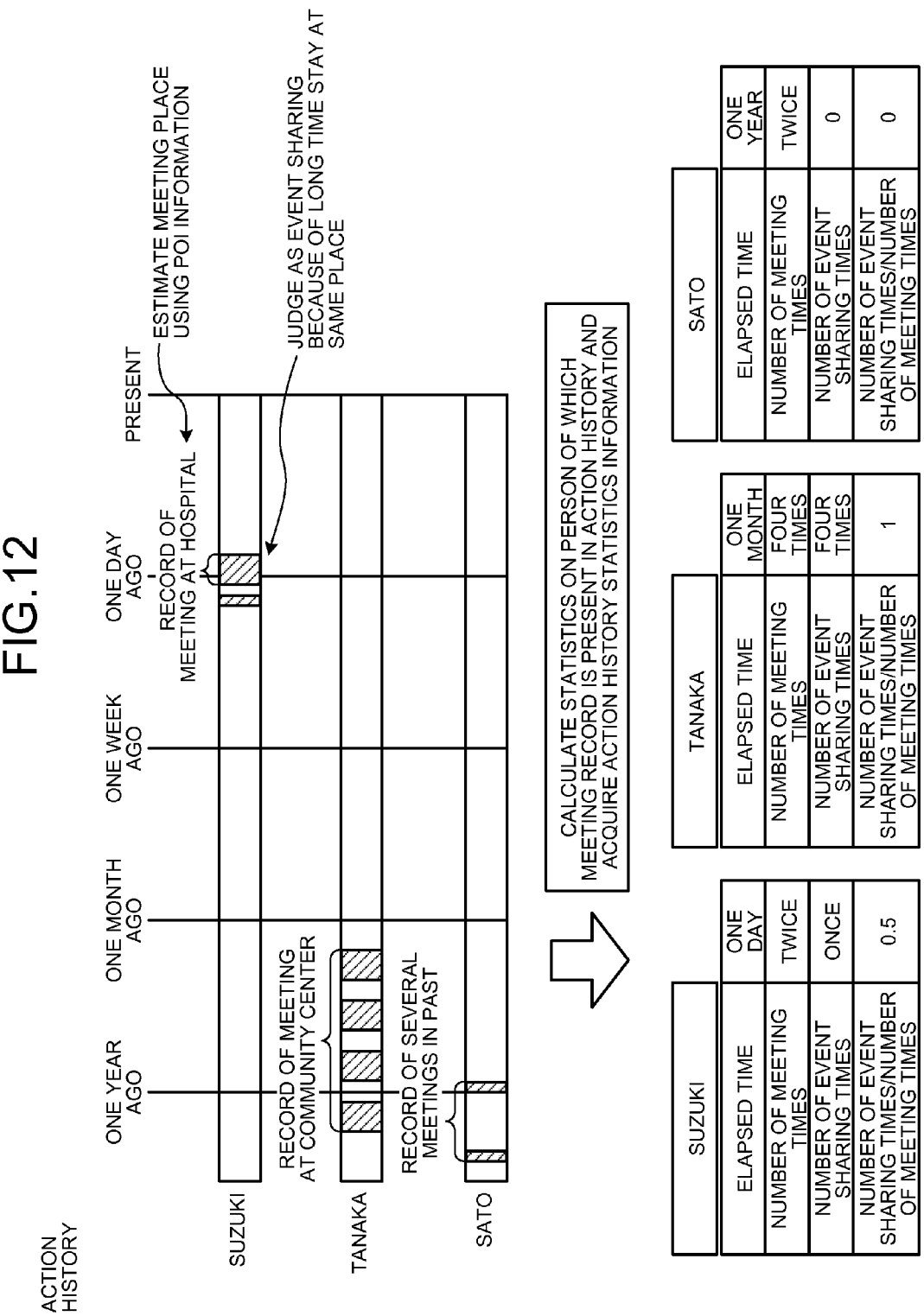
FIG. 12 is a diagram illustrating a specific example of action history statistics information.
Figure 13:
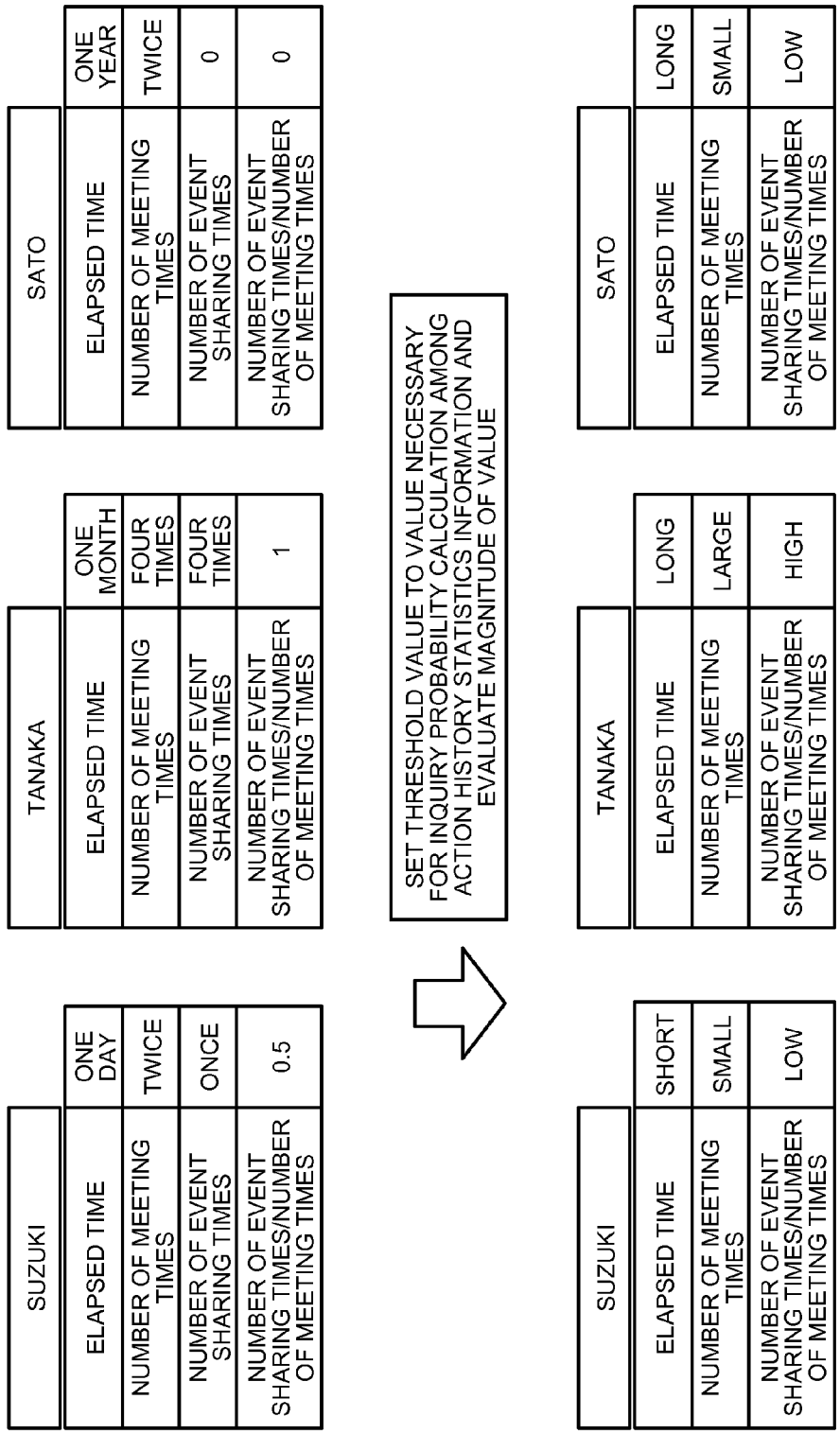
FIG. 13 is a diagram illustrating an evaluation example on action history statistics information.

For example, when the statistical result is obtained for each personal name represented in association with the history of the action "meet" in the user's action history information in step S4 as illustrated in FIG. 12, each value of the elapsed time, the number of meeting times, the number of event sharing times, and the ratio of the number of event sharing times to the number of meeting times is evaluated on each of "Suzuki," "Tanaka," and "Sato" which are response candidates to the inquiry as illustrated in FIG. 13.

Prior to the evaluation, it is preferable to perform normalization on the value represented by the action history statistics information. For example, when the statistical result is obtained for each personal name represented in association with the history of the action "meet" in the user's action history information in step S4 as illustrated in FIG. 12, as for the elapsed time and the number of meeting times, preferably the action history search device 50 acquires a maximum value from among all pieces of action history statistics information, performs normalization of each value represented by the action history statistics information of each personal name using it; and then evaluates the magnitude of the value on each of the elapsed time, the number of meeting times, and the ratio of the number of event sharing times to the number of meeting times using a threshold value of a floating-point number from "0" to "1." The reasons for performing normalization are as follows. By performing normalization, the magnitude relation of the value can be judged by a constant threshold value without being affected by the magnitude of the value represented by the action history statistics information. For example, it is possible to prevent statistics from being inclined to a large value among values represented by the action history statistics information when statistics is obtained using a large number of pieces of action history information. Also, it is possible to avoid a problem in that a threshold value is smaller than a value represented by the action history statistics information and thus does not function as a threshold value.

When the elapsed time is shorter than seven days, the judgment unit 64 judges that the inquiry probability is low using the above-mentioned evaluation. When the elapsed time is seven days or more, the number of meeting times is three times or more, and the ratio of the number of event sharing times to the number of meeting times is "0.5" or more, the judgment unit 64 judges that the inquiry probability is moderate. When the elapsed time is seven days or more, the number of meeting times is three times or more, and the ratio of the number of event sharing times to the number of meeting times is smaller than "0.5," the judgment unit 64 judges that the inquiry probability is high. When the elapsed time is seven days or more, the number of meeting times is smaller than three times, and the ratio of the number of event sharing times to the number of meeting times is "0.5" or more, the judgment unit 64 judges that the inquiry probability is high. When the elapsed time is seven days or more, the number of meeting times is smaller than three times, and the ratio of the number of event sharing times to the number of meeting times is smaller than "0.5," the judgment unit 64 judges that the inquiry probability is high. In the narrowing-down model illustrated in FIG. 11 and the evaluation result of the action history statistics information illustrated in FIG. 13, "Sato" is judged as being "high in the inquiry probability," "Tanaka" is judged as being "moderate in the inquiry probability," and "Suzuki" is judged as being "low in the inquiry probability."

Figure 14:
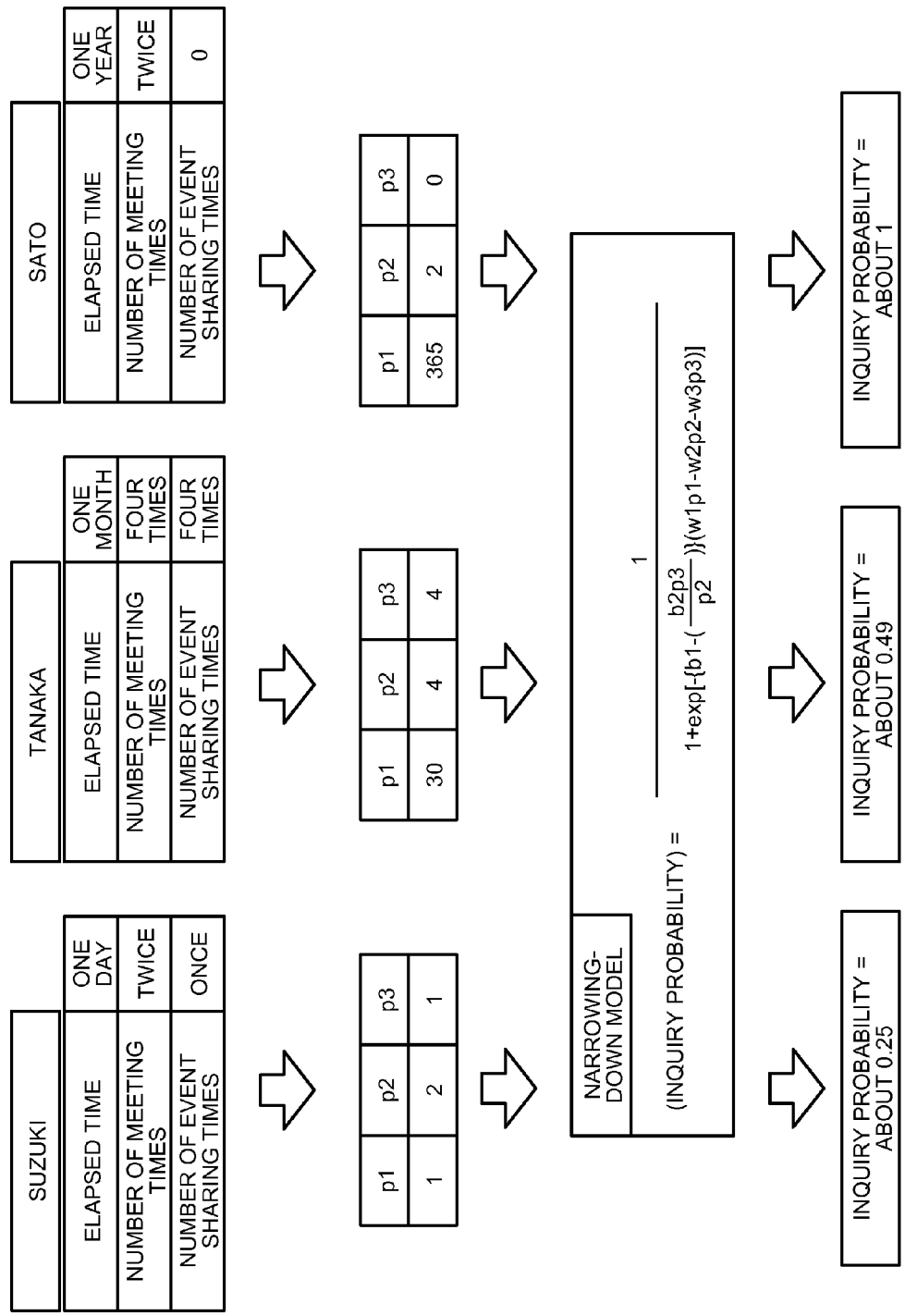
FIG. 14 is a diagram illustrating another example of a narrowing-down model.

The narrowing-down model is not limited to the above example. For example, as illustrated in FIG. 14, the narrowing-down model may be a function in which the elapsed time, the number of meeting times, the number of event sharing times, and the ratio of the number of event sharing times to the number of meeting times which are represented by the action history statistics information are used as independent variables, respectively. The judgment unit 64 may calculate a probability value representing the inquiry probability using the function. In the example of FIG. 14, the narrowing-down model is a sigmoid function in which the elapsed time is treated as an independent variable p1 (the number of days), the number of meeting times as an independent variable p2, the number of event sharing times as an independent variable p3, and a value from "0" to "1" is obtained as a probability value of the inquiry probability. In this sigmoid function, coefficients w1, w2, and w3 for weighting the values of the action history statistics information are set; and coefficients b1 and b2 for applying appropriate bias to the sigmoid function are set. FIG. 14 illustrates values respectively calculated on "Suzuki," "Tanaka," and "Sato" which are the response candidates to the inquiry when "b1=0.1, b2=0.09, w1=1, w2=7, and w3=7" is set. In this narrowing-down model, it may be difficult to find a function suitable for calculating the inquiry probability; but the inquiry probability can be evaluated by treating respective values represented by the action history statistics information in parallel. For this reason, by using a weighting coefficient of an appropriate value and a function of an appropriate form, for example, it is also possible to perform an implementation in which an inquiry probability is set to a low value on a person having a relationship, called "old friend," in which the elapsed time after last meeting is long but the number of meeting times or the number of event sharing times is large. Meanwhile, in the narrowing-down model illustrated in FIG. 11, such an implementation may be difficult to perform; but there is a merit that it is simple and easy to add a condition later.

Returning to the description of FIG. 5, in step S7, the action history search device 50 selects the response candidate having a high inquiry probability as the judgment result of the inquiry probability and outputs search result information representing the response candidate as the search result. In step S8, through the function of the output unit 65, the action history search device 50 outputs the response candidate information on the inquiry received by the inquiry processing unit 60 using the search result information output in step S7 and the analysis result output in step S4; and presents the user with the response candidate information. A function of presenting the user with the response candidate information is not particularly limited but may have, for example, a form of displaying the response candidate information on the display unit 55. For example, when the action history search device 50 is a mobile device, the operation unit 56 and the display unit 55 are usually integrated as a touch screen; and in this case, the action history search device 50 may perform display implementation through the touch screen.

Figure 15:
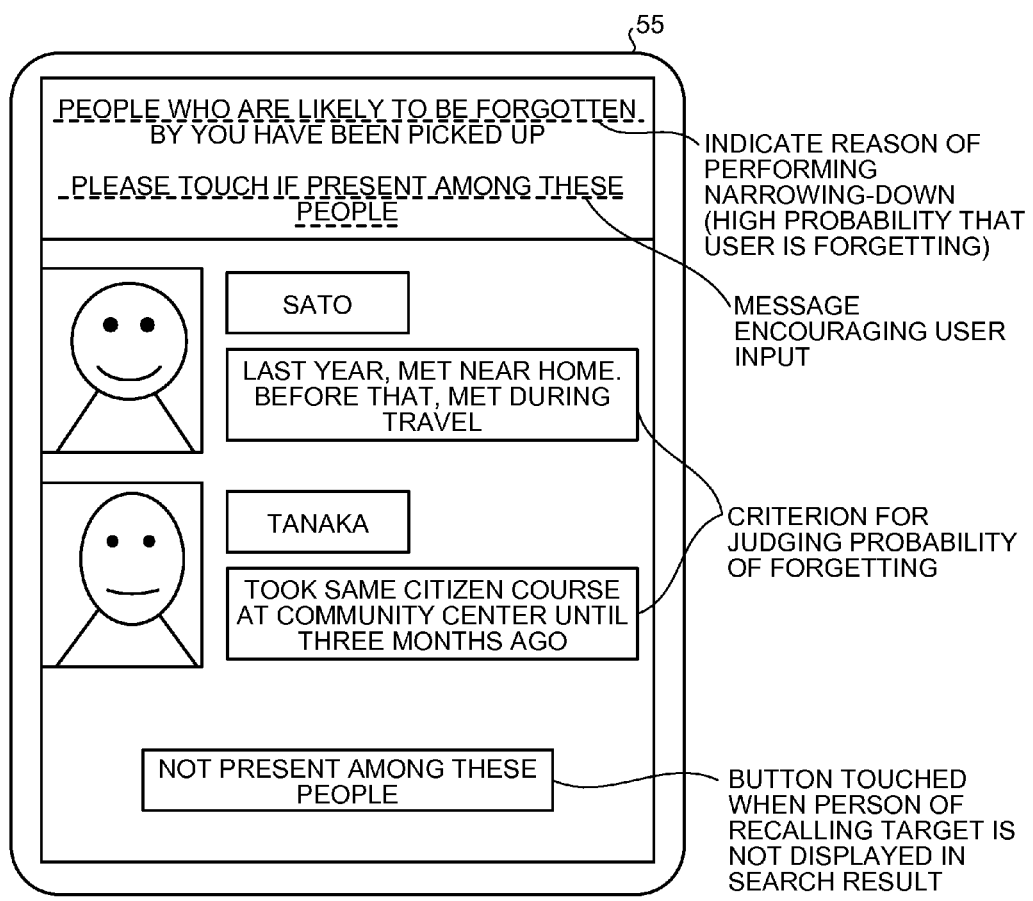
FIG. 15 is a diagram illustrating a display example in a touch screen.

FIG. 15 is a diagram illustrating a display example in a touch screen. Referring to FIG. 15, as the response candidate information, the reason for having performed narrowing-down is displayed. Furthermore, displayed are a message for encouraging the user's operation input, the response candidate represented by the search result information, a message representing a criterion for having judged a probability that the user is forgetting the response candidate, that is, the inquiry probability on the response candidate for each response candidate, and an operation button for performing an operation input representing the fact that it is no response desired by the user. Further, when only a response candidate having a high inquiry probability is output in relation to an output condition on the search result, the reason for having performed narrowing-down is expressed, for example, like "person who is likely to be forgotten by you." The message for encouraging the user's operation input is, for example, a message for encouraging the user to perform an operation input for determining the user's desired response if the user's desired response is present among the response candidates. In the example of FIG. 15, the personal names of "Sato" and "Tanaka" are displayed as the response candidates. Furthermore, when image data representing an image of a face of a person having a corresponding personal name is stored in association with each personal name, a face photograph represented by the image data is displayed. The criterion of having judged a probability that the user is forgetting the response candidate is expressed by a sentence. The sentence expresses, for example, history of the action of the type, which defines the range of the action history information (the search target), using the elapsed time represented by the action history statistics information corresponding to the response candidate and the place name represented by the place name information output as the analysis result in step S4. For example, as for "Sato," when the elapsed time represented by the action history information is one year and his/her home is specified as the place name on the position represented by the action history information used for calculation of the elapsed time as illustrated in FIG. 12, a message stating "met near home in the last year" is displayed in association with the personal name "Sato."

Since the response candidate information is presented in the above-described form on the inquiry uttered by the user, compared to the case in which only the personal name is presented as the response candidate, the user can receive more many hints of recalling a person having a presented personal name. The purpose of having the user recall a personal name, for which the inquiry has been made, can be more reliably achieved. Furthermore, there is a merit that the user can grasp a relationship with a person judged as high in probability of making an inquiry. When the user's desired response is present, the user who has seen such display performs an operation input for determining the user's desired response, so that correction of the narrowing-down model can be implemented.

For example, when the operation unit 56 and the display unit 55 are formed as the touch screen as described above, in the example of FIG. 15, an area displayed for each personal name is set as an area for performing an operation input for determining the corresponding personal name as the response. When the user performs the operation input of touching the corresponding area, in step S9 of FIG. 5, the action history search device 50 judges that the personal name corresponding to the corresponding area has been determined as the response to the inquiry. By determining the user's desired response, in relation to the action of the type associated with the target on which the inquiry is made by the user, the action history search device 50 can recognize a combination of the contexts, such as an elapsed time until an inquiry is made by the user, the frequency related to an action, and a place where an action has occurred in the action history statistics information illustrated in FIG. 12.

In step S10, through the function of the narrowing-down model correction unit 66, the action history search device 50 corrects the narrowing-down model stored in the narrowing-down model storage unit 69. The correction is made such that statistical results having elapsed times and frequencies related to the action, which are of the same degree as ones represented by the action history statistics information on the response candidate determined in step S9, have the higher inquiry probability for the next inquiry. By performing this correction, the action history search device 50 can more effectively perform narrowing-down on the final search result in a form adapted for the user.

Figure 16:
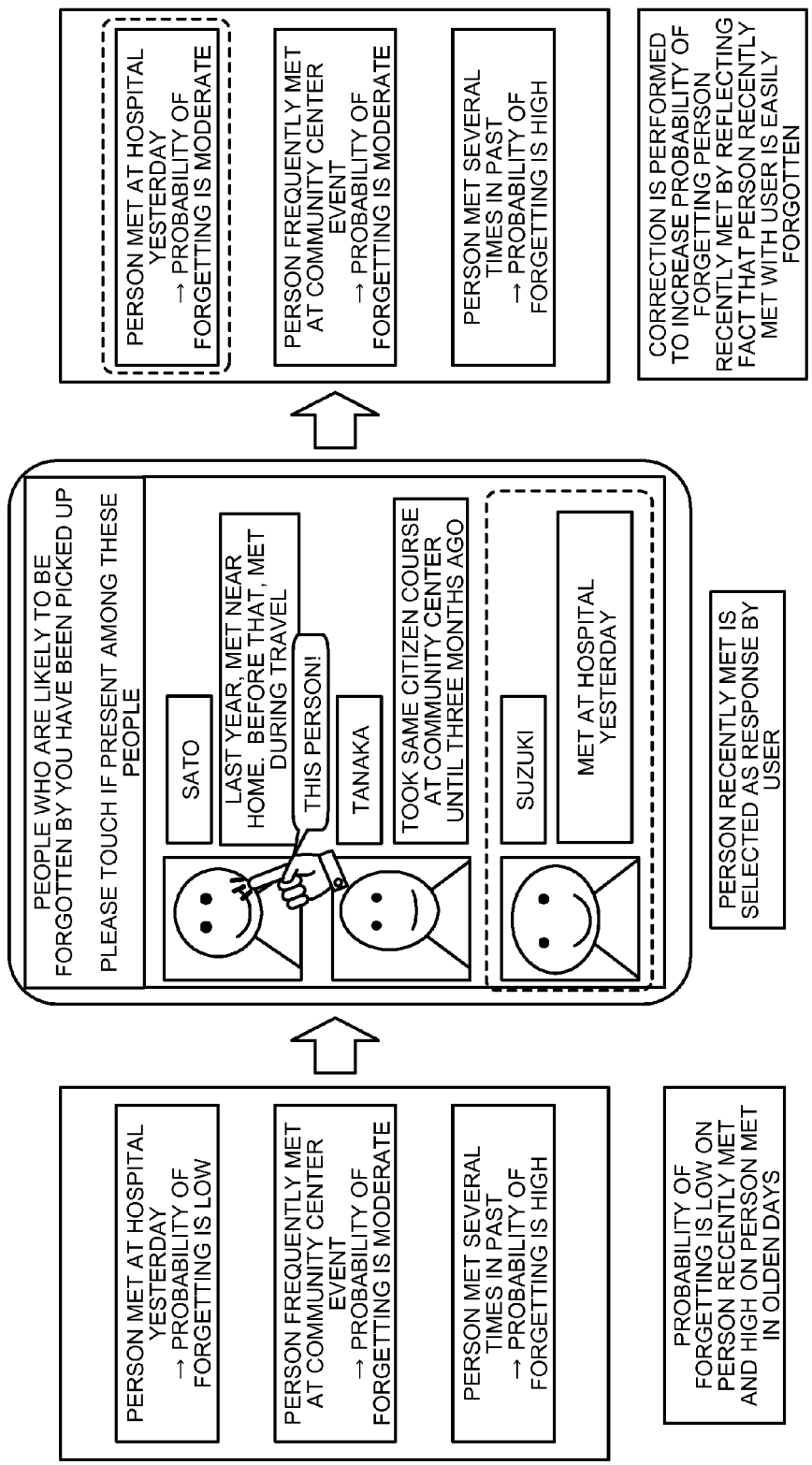
FIG. 16 is a diagram explaining an example of correcting a narrowing-down model.
Figure 17:
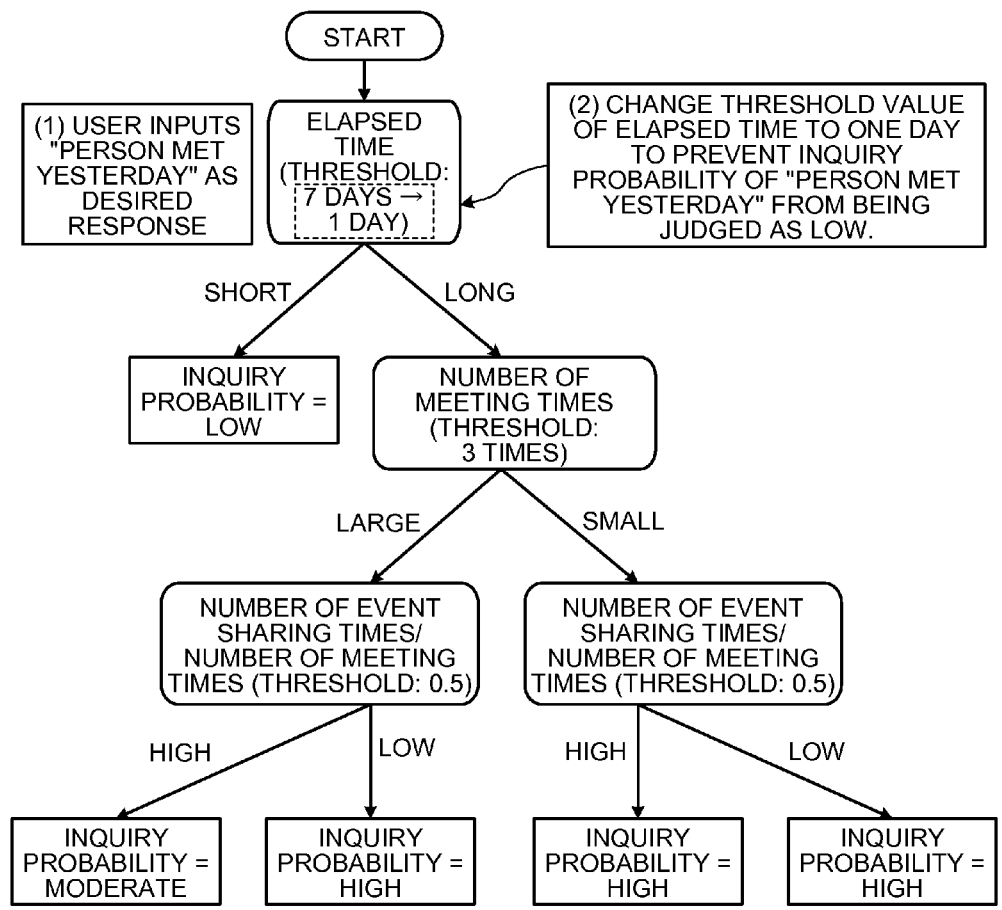
FIG. 17 is a diagram explaining an overview of a judgment of a user's inquiry probability using a corrected narrowing-down model.

An example of correcting the narrowing-down model will be described with reference to FIG. 16. In a non-corrected narrowing-down model, for example, when the elapsed time is shorter than 7 days, it has been judged that the inquiry probability is low; and when the elapsed time is 7 days or more, it has been judged that the inquiry probability is moderate or high. However, in the examples of FIGS. 12 and 13, if it is assumed that an operation input representing that "Suzuki" met one day ago is the user's desired response has been performed, when the elapsed time is one day or more, it is preferable to judge that the inquiry probability is moderate. In order to perform such a judgment, the action history search device 50 corrects the narrowing-down model by changing a threshold value of the elapsed time in the narrowing-down model from 7 days to 1 day as illustrated in FIG. 17.

When the narrowing-down model is the function illustrated in FIG. 14, the action history search device 50 changes the coefficients b1 and b2 and the coefficients w1, w2, and w3 to pass through an inflection point of the sigmoid function at the stage at which the elapsed time is short; but when it is difficult to find an appropriate function by changing the coefficients, the narrowing-down model is corrected so that a function of another form such as the Gaussian distribution is used as the narrowing-down model.

Through such correction, history of the user's inquiry and an action occurrence pattern represented by the action history information can be reflected on the narrowing-down model. An initial value of the narrowing-down model is preferably set to implement the distribution of a probability of the occurrence of an inquiry which is not intuitively contrary to our daily life. For example, it is preferable to set the narrowing-down model in which the inquiry probability is judged as being low on a person recently met, and the inquiry probability is judged as being high on a person met a long time ago. Concerning this narrowing-down model, a case can be considered in which the distribution of probability represented by the initial narrowing-down model does not fit, such as the case in which an action happened recently is easily forgotten due to the reason of aging, a health problem, or the like but an action happened a long time ago is not forgotten. Even for a such case, it is possible to correct the narrowing-down model so that the distribution of inquiry probability appropriate for the user can be implemented in response to the user's operation input for presenting the response candidates to the inquiry.

When an operation input of touching an operation button illustrated in FIG. 15 is performed, the action history search device 50 judges that the user's desired response has not been present among the presented responses; selects a response candidate other than ones selected as the response candidate in step S7 of FIG. 5 through the function of the judgment unit 64; and outputs search result information representing the corresponding response candidate as the search result again. Then, the action history search device 50 performs step S8 again; outputs the response candidate information; and encourages the user's operation input.

In step S8, the action history search device 50 may output the response to the inquiry by voice. In this case, for example, the sentence illustrated in FIG. 15 may be output by voice. At this time, when the user utters "I know Mr. ○○" by voice or "It's Mr. ▽▽," the action history search device 50 receives the voice and judges whether or not it has been the user's desired response in response to the voice in step S9. However, when any voice has not been returned from the user for a long time, it may be judged the user's desired response is not present.

As described above, in the present embodiment, when there has been the inquiry from the user, the action history search device 50 analyzes the inquiry, judges the target of inquiry, and judges the type of action represented by the action history information according to the target of inquiry, thereby narrowing down the action history information to the search target. Then, the action history search device 50 generates the action history statistics information based on the action history information representing the history of the action of the decided type and the inquiry time; and judges the inquiry probability on the response candidate to the inquiry using the action history statistics information and the narrowing-down model. Then, the action history search device 50 narrows down the response candidate by selecting the response candidate according to the judgment result and presents the response candidate information representing the selected response candidate. According to this configuration, even when a keyword designating a time is not included in the inquiry from the user, it is possible to search for the action history information and present the response candidate having a high probability as the response to the inquiry; and it is possible to present the response meaningful to the user.

Meanwhile, in the conventional art, when the action history information is searched without narrowing down timing, all pieces of the user's action history information are the search target; and so a large amount of noise might be included in the search result. However, in the present embodiment, through the above-described configuration, the inquiry probability is judged on each response candidate; the narrowed-down response candidate is presented according to the judgment result; and a criterion used for performing narrowing-down and a criterion used for judging a probability that the user is forgetting the response candidate are presented. Thus, the noise included in the search result can be reduced.

In the above-described embodiment, the action history search device 50 has used the action history information and the POI information when generating the action history statistics information through the function of the calculation unit 63. However, information used for generating the action history statistics information is not limited thereto. For example, when the schedule information illustrated in FIG. 4 is previously stored in the auxiliary storage unit 53, the schedule information may be used.

In the above-described embodiment, the action history search device 50 has evaluated whether there has been many opportunities to conduct the same activity at the same place with a certain person using the number of event sharing times. However, at the time of the evaluation, a person who has conducted the same activity as the user may be estimated by further using the schedule information illustrated in FIG. 4 as well as the action history information and the POI information. For example, when a place represented by the schedule information is a university, an event name is a "course," and a remark is "a small number of people," if a time zone from a start date and a start time to an end date and an end time which are represented by the schedule information overlaps a start time and an end time represented by the action history information representing the history of the action "meet," it can be estimated that a person having a personal name represented by the corresponding action history information has taken the same course as the user. When there are a plurality of pieces of action history information that are almost the same in the length of a time between meeting and leaving, that is, a time between a start time and an end time, it is possible to discriminate whether or not it has been a long time stay at the same place or whether or not an action has been made at the same place during certain activity while sharing the purpose; and it is possible to more minutely give the meaning to the history of the action "meet" and use the meaning to narrow down the search result. In the case of the former example, when there are a plurality of people met in the same university, it is judged based on the schedule information that a probability is high that a person met in a time zone at which a course has been scheduled, that is, a person having taken the same course probably remains in the user's memory compared to a person merely met in a university. That is, it is possible to judge that the inquiry probability on the personal name of the person is low.

Second Embodiment

Next, a description will be made in connection with an action history search device according to a second embodiment. Parts which are common with the first embodiment are described using the same reference numerals, and a redundant description thereof will not be repeated.

Figure 18:
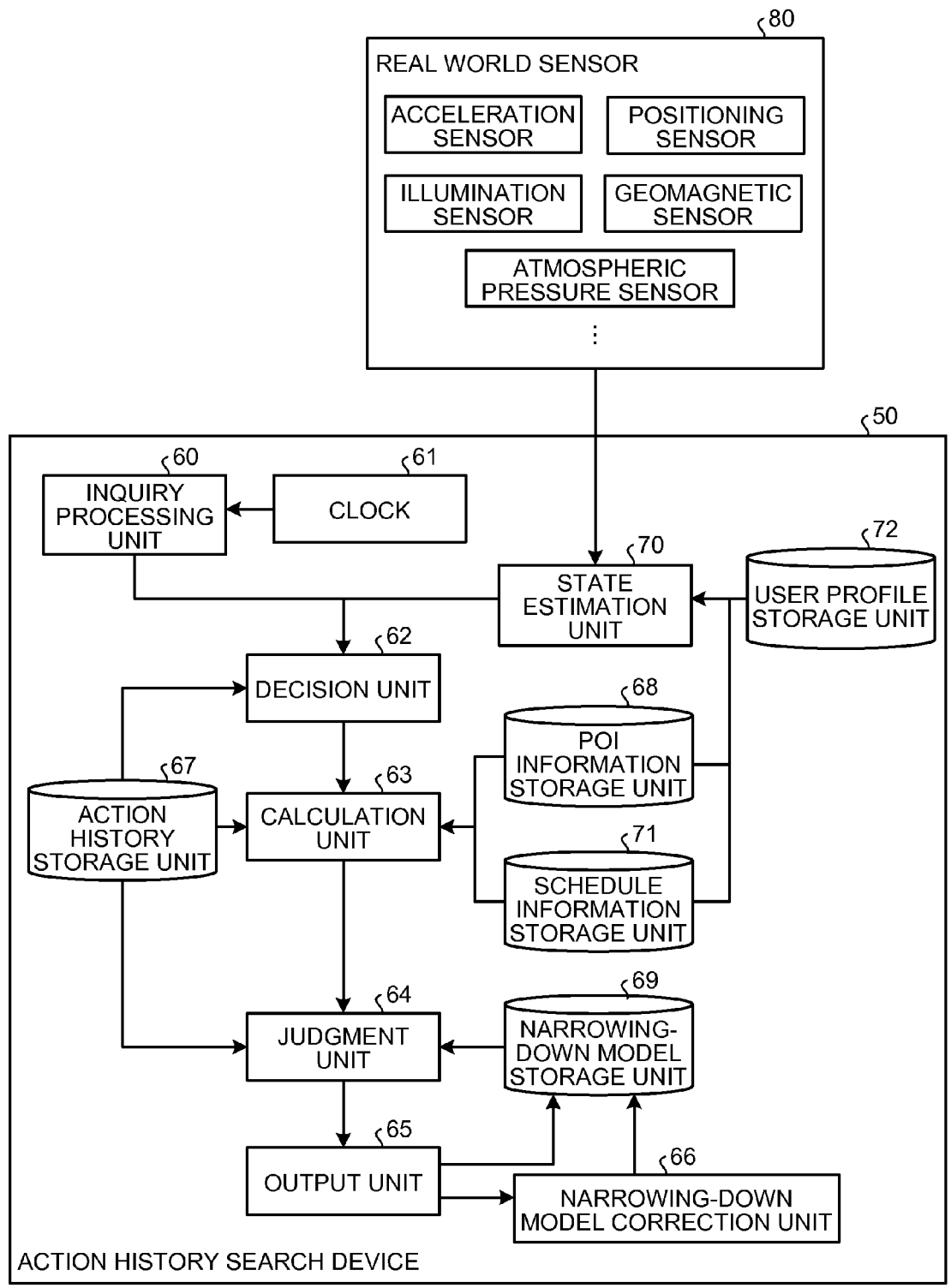
FIG. 18 is a diagram illustrating a functional configuration of an action history search device according to a second embodiment.

In the present embodiment, an action history search device 50 estimates the user's state and decides the range of the action history information (the search target) according to the estimated state and the inquiry time. FIG. 18 is a diagram illustrating a functional configuration of the action history search device 50 according to the present embodiment. A real world sensor 80 is connected to the action history search device 50. For example, the real world sensor 80 includes at least one of an acceleration sensor that measures acceleration, a positioning sensor that measures the position, an illumination sensor that measures illumination intensity, an atmospheric pressure sensor that measures atmospheric pressure, and a geomagnetic sensor that measures a direction of geomagnetism. The real world sensor 80 transmits the measured information (referred to as "measurement information") to the action history search device 50. The action history search device 50 further includes a state estimation unit 70, a schedule information storage unit 71, and a user profile storage unit 72 in addition to an inquiry processing unit 60, a clock 61, a decision unit 62, a calculation unit 63, a judgment unit 64, an output unit 65, an action history storage unit 67, a POI information storage unit 68, a narrowing-down model storage unit 69, and a narrowing-down model correction unit 66. The state estimation unit 70 is implemented by executing various programs stored in the main storage unit 52 or the auxiliary storage unit 53 through the CPU of the action history search device 50. The schedule information storage unit 71 and the user profile storage unit 72 are storage areas secured in the auxiliary storage unit 53.

The schedule information storage unit 71 stores schedule information. A data configuration of the schedule information is the same as illustrated in FIG. 4. The user profile storage unit 72 stores user profile information representing a profile such as the user's attribute or background. FIG. 19 is a diagram illustrating a data configuration of the user profile information. The user profile includes basic information, background information, and additional information. The basic information refers to the user's personal information and includes information, which is associated with each individual and low in probability that its content will change, such as a name, a sex, a birth date, a nationality, and a legal domicile. Basically, the information included in the basic information hardly changes or is added. However, the content represented by each piece of information included in the basic information may change depending on the information. For example, information of a name may change due to marriage, and information of a nationality may change due to naturalization. The background information refers to information representing history of big social events such as school graduation or taking a job as the user's background. The background information represents a date at which an event has happened in association with the content thereof. The addition information refers to additional information which is not represented by the basic information and includes information, which is associated with each individual but high in a probability that the content thereof will change, such as an organization to which the user belongs or a hobby. The information included in the background information may change or be added unlike the basic information; and the content represented by the information may also change. The registration of each piece of information included in the user profile information is basically performed in response to the user's operation input through the operation unit 56. In addition, history of the action represented by the action history information may be read as an event that has happed to the user; and the background information representing the event may be added to the user profile information. Furthermore, the fact that background information representing the content such as marriage has been added to the user profile information may be read; and information representing that there is a wife may be added to the user profile information representing a family configuration.

The state estimation unit 70 estimates the user's current state using the schedule information stored in the schedule information storage unit 71, the user profile information stored in the user profile storage unit 72, the measurement information transmitted from the real world sensor 80, and the POI information stored in the POI information storage unit 68.

The judgment unit 64 decides the range of the action history information (the search target) with reference to the action history information stored in the action history storage unit 67 using the target of inquiry output from the inquiry processing unit 60 and the user's state estimated by the state estimation unit 70; and outputs the search range information representing the decided range together with the inquiry time.

Figure 22:
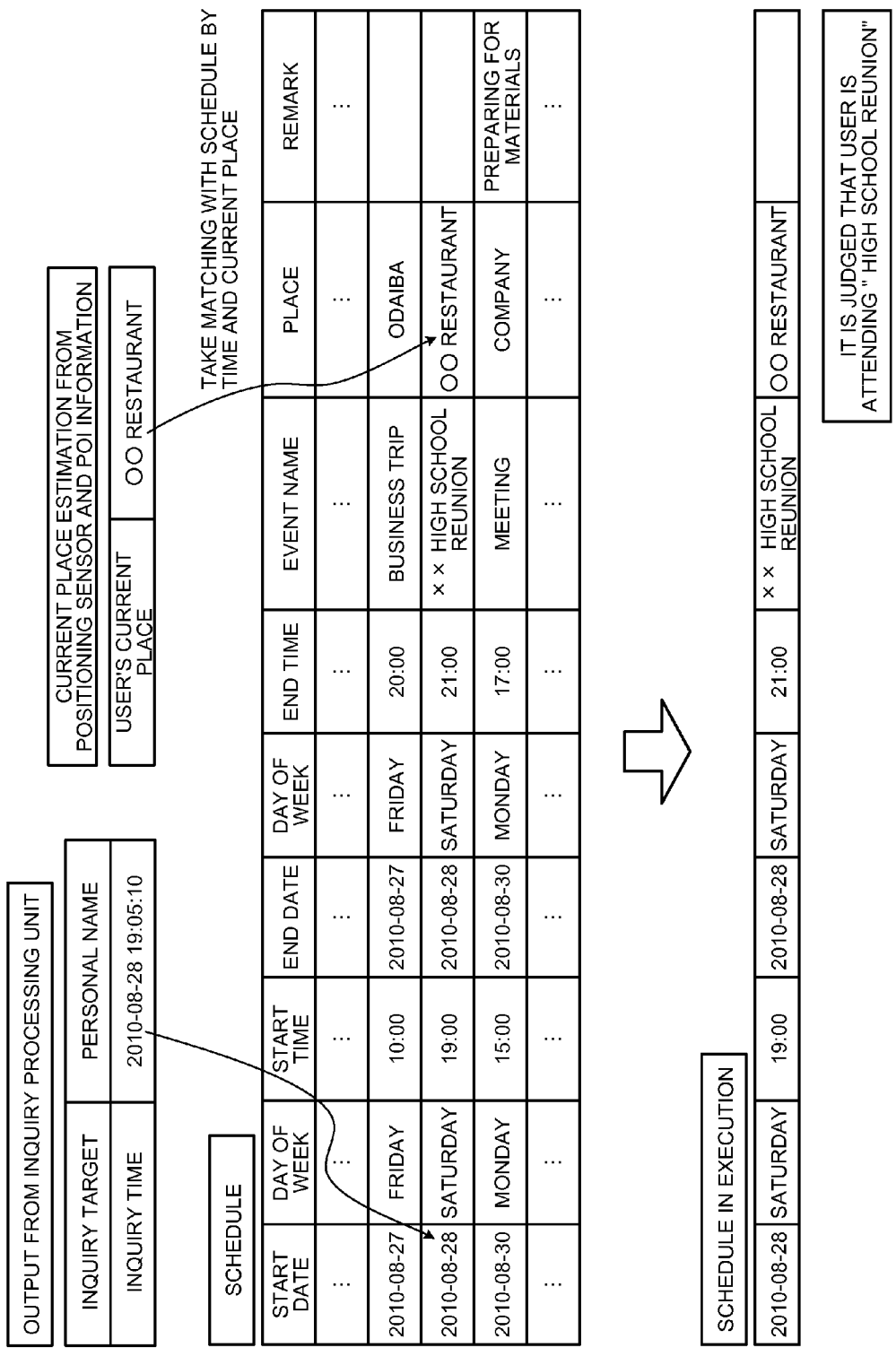
FIG. 22 is a diagram illustrating an example of estimating a user's current action.

Next, a procedure of an action history search process performed by the action history search device 50 according to the present embodiment will be described with reference to FIG. 20. Step S1 to step S2 are the same as in the first embodiment. Here, let us assume that an inquiry stating "who is the person?" has been received in step S2. Thereafter, in step S30, through the function of the state estimation unit 70, the action history search device 50 specifies the user's current action with reference to the schedule information stored in the schedule information storage unit 71 using the inquiry time output in step S2 and the user's current position. FIG. 21 is a diagram illustrating a data example of the schedule information. Specifically, for example, the positioning sensor is used as the real world sensor 80; and the action history search device 50 specifies a place name, which is represented by the POI information stored in the POI information storage unit 68 in association with the latitude and the longitude, using the latitude and the longitude of the user's current position represented by the measurement information transmitted from the real world sensor 80. The action history search device 50 compares the inquiry time with the start time and the end time represented by the schedule information and judges whether or not there is schedule information in which the inquiry time is present between the start time and the end time. When it is judged that there is the schedule information, the place name represented by the schedule information is specified. Then, the action history search device 50 judges whether or not the corresponding place name matches with the place name specified using the measurement information from the real world sensor 80 and the POI information. When it is judged that the corresponding place name matches with the specified place name, it is judged that the user is currently conducting an action having an event name represented by the schedule information, and thus the user's current action is specified. When the schedule information illustrated in FIG. 21 is used, it is judged that the user is currently attending a "xx high school reunion" as illustrated in FIG. 22.

Figure 20:
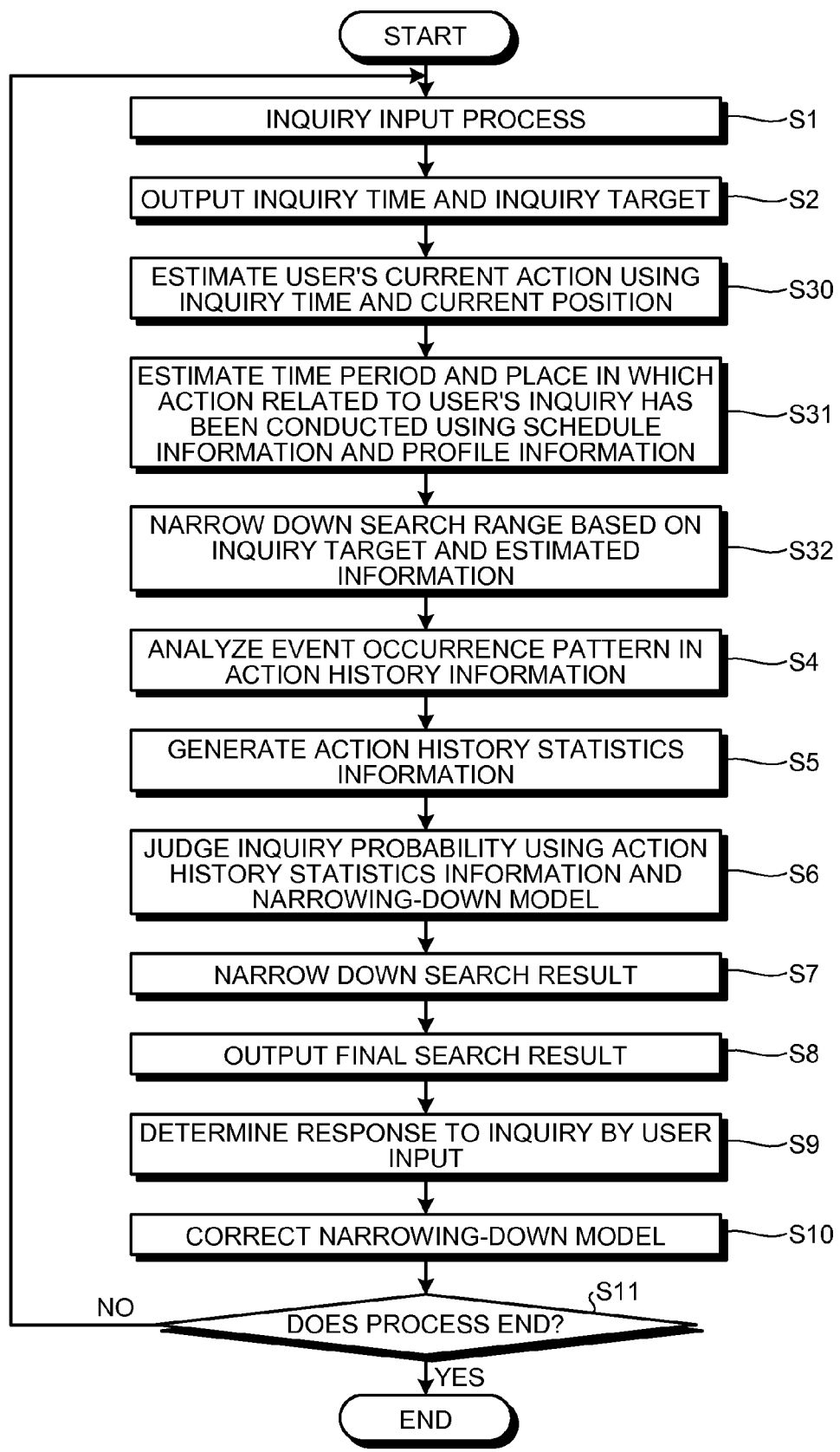
FIG. 20 is a flowchart illustrating a procedure of an action history search process.
Figure 23:
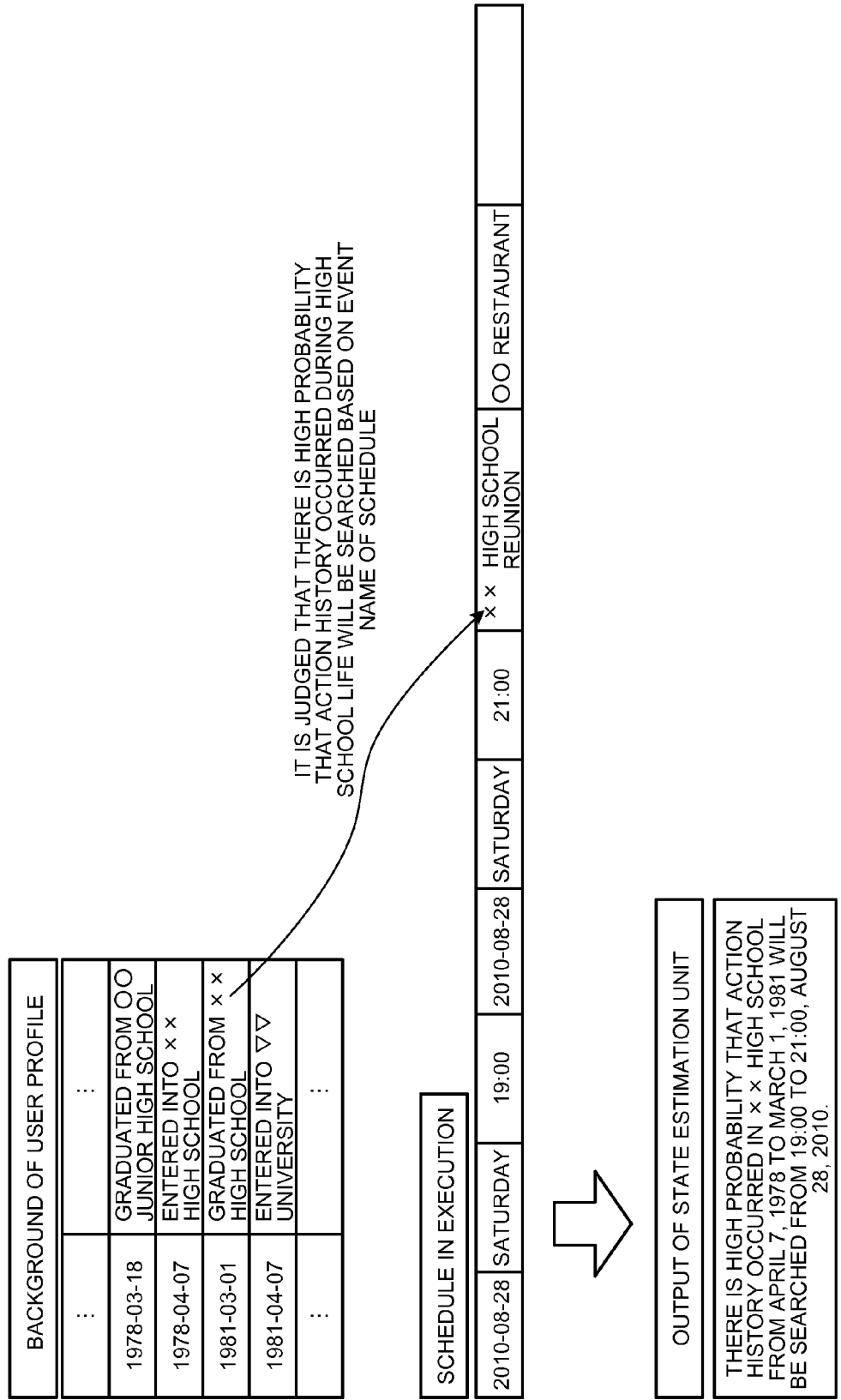
FIG. 23 is a diagram explaining an example of narrowing down a range of a search target.

Returning to the description of FIG. 20, in step S31, the action history search device 50 performs matching between the schedule information representing the user's current action specified as described above as the schedule and the user profile information; and estimates a time and a place at which an action related to the user's inquiry has happened. Specifically, the action history search device 50 can judge the user's graduated high school using the background information included in the user profile information as illustrated in the example of FIG. 19 with respect to the event name "xx high school reunion" represented by the schedule information representing the user's current action as the schedule; and estimates that the user's inquiry relates to an action conducted in the user's graduated high school. In this case, based on the user profile information, the action history search device 50 judges a time period in which the user has been enrolled in the graduated high school; represents the time period; and outputs search range estimated information representing the name of the corresponding high school as the place name. Here, the search range estimated information may represent the event name including the name of the corresponding high school instead of the place name or in addition to the place name. In the example of FIG. 23, output is the search range estimated information that represent a time period from Apr. 7, 1978 to Mar. 1, 1981 and represents "xx high school" as the place name.

Returning to the description of FIG. 20, in step S32, the action history search device 50 decides the type of action represented by the action history information as the range of the action history information (the search target) among the action history information stored in the action history storage unit 67 using the target of inquiry output in step S2; and further decides the start time, the end time, and the position represented by the action history information as the range of the action history information (the search target) using the search range estimated information output in step S31. Specifically, for example, as for the inquiry stating "who is the person?" similarly to the first embodiment, the action history search device 50 judges that the target of inquiry is "personal name." Thus, the action history search device 50 decides the action history information representing the history of the action of the type "meet" as the range of the action history information (the search target); and decides the action history information, in which at least one of the start time and the end time is included within the time period from Apr. 7, 1978 to Mar. 1, 1981 represented by time period estimated information and the latitude and the longitude corresponding to the place name of "xx high school" are represented as the position, as the range of the action history information (the search target). That is, on the inquiry that has been generated in the state in which the user is attending the high school reunion, the action history information representing the history of the action shared with people in the high school during a time period in which the user has been enrolled in the high school is decided as the range of the search target. The latitude and the longitude corresponding to the place name of "xx high school" are preferably specified with reference to the POI information stored in the POI information storage unit 68.

However, even though the range of the search target is narrowed down, there may be hundreds of people who have interacted in the high school during the time period in which the user has been enrolled in the high school, and thus it may be difficult to obtain an effective search result. For this reason, the action history search device 50 preferably further minutely narrows down the range of the search target such as the action history information representing the history of the action shared with people in the high school during the time period in which the user has been enrolled in the high school.

As a method of further minutely narrowing down the range of the search target, conceivable is a method in which the action history search device 50 further minutely analyzes the user profile information and the schedule information; further extracts information relevant to the action stating that the user attends the high school reunion; and uses the extracted information for narrowing down the range of the search target. For example, when information specifying a school year and a class name like "xx high school first grade first class reunion" is included as the event name represented by the schedule information, the action history search device 50 narrows down the action history information, in which at least one of the start time and the end time is included within the time period in which the user has been in the first grade in the high school and which represents the event name including "xx high school first grade first class," as the range of the search target. As a result, the action history search device 50 can narrow the number of people having interacted with the user during the time period down to merely about tens of people which is the number of people of one class; and can increase a probability capable of presenting the effective search result.

When information related to club activity conducted during the time period in which the user has been enrolled in the high school is included in the user profile information, by narrowing down the range of the search target so that the response candidate is confined to people met in club activity among the action history information representing the history of the action during the time period in which the user has been enrolled in the high school, it is possible to increase a probability of obtaining the search result meaningful to the user. For example, when information representing the fact that it has simultaneously belonged to the club to which the user has belonged during the time period in which the user has been enrolled in the high school is obtained in association with a personal name, the action history search device 50 preferably decides the action history information representing the history of the action shared with people who has simultaneously belong to the club to which the user has belonged during the time period in which the user has been enrolled in the high school as the range of the search target. When the range of the search target has been narrowed down as described above, unless the club is very large, people which can be the response candidate as people belonging to the club are narrowed down to about several to tens of people. When the range of the search target is narrowed down using information, related to club activity conducted in the past by the user, such as information related to the club activity as information included in the profile information, since it is assumed that there is a high probability of talking with a person who has frequently hung around during school days through club activity or the like, the range of the search target may be set in advance so that a person who has belonged to the same club can be the response candidate. For example, the user's conversion may be analyzed by voice recognition; a keyword related to an action of school days such as club activity may be acquired; and the range of the search target may be narrowed down to action history information related to the keyword.

The above description has been made in connection with the example in which the user has conducted an action of attending the high school reunion. However, even in the case other than the reunion like the data example of the schedule information illustrated in FIG. 21, the action history search device 50 may narrow down the range of the search target using the user profile information illustrated in FIG. 19 and the measurement information measured by the real world sensor 80. For example, when the user is conducting an action of a business trip, if there is an inquiry stating "what is the previously dealt product?" the action history search device 50 judges the target of inquiry as "previously dealt product" in step S2 of FIG. 20; and judges that the user is currently on a business trip by referring to the schedule information stored in the schedule information storage unit 71 using the inquiry time and the user's current position in step S30 in the same manner as described above. At this time, when the user profile information related to the corresponding user is not stored, the action history search device 50 may be difficult to narrow down what can be presented as the response candidate on "previously dealt product" which is the target of inquiry. However, by using "OO company" which is an attribute represented by the additional information included in the user profile information, it is possible to estimate that there is a high probability that a product provided by "OO company" can be the response candidate on the target of inquiry stating "previously dealt product" during the user's business trip. Using the estimation result, the action history search device 50 may decide the action history information, which represents the fact that the product provided by "OO company" has been dealt with as the history of the action, as the range of the search target.

Returning to the description of FIG. 20, thereafter, the action history search device 50 outputs the search range information representing the type decided as the range of the action history information (the search target) and the time period represented by the time period estimated information together with the inquiry time. In step S4, the action history search device 50 analyzes the action history information which represents the history of the action of the type represented by the search range information output in step S31 and in which at least one of the start time and the end time is included within the time period represented by the search range information; calculates the elapsed time and statistics of the frequency related to an action; and generates the action history statistics information representing the statistical result. Step S5 to step S11 are the same as in the first embodiment.

As described above, in the present embodiment, by reflecting an idea, i.e., the target recalled by the user changes according to the user's current state, and then narrowing down the response candidate to the user's inquiry, it is possible to present the response more meaningful to the user.

Third Embodiment

Next, a description will be made in connection with an action history search device according to a third embodiment. Parts which are common with the first embodiment or the second embodiment are described using the same reference numerals, and a redundant description thereof will not be repeated.

Figure 24:
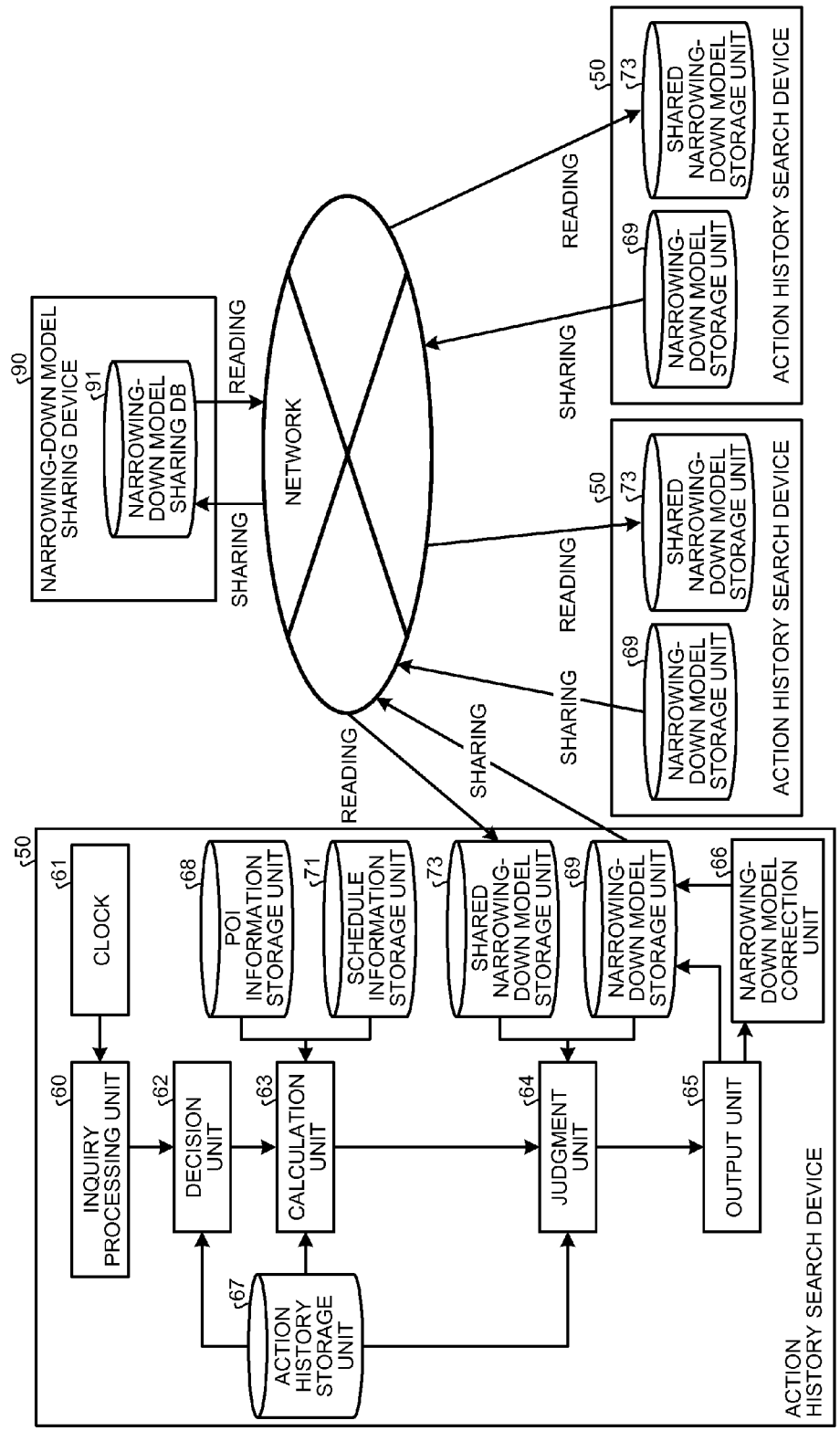
FIG. 24 is a diagram illustrating a configuration of an action history search system according to a third embodiment.

In the present embodiment, a narrowing-down model, which is disposed, in each of a plurality of action history search devices 50, corresponding to the individual user of each action history search device 50, is shared with the plurality of action history search devices 50 and used for narrowing down the range of the search target of the action history information. FIG. 24 is a diagram illustrating a configuration of an action history search system according to the present embodiment. As illustrated in FIG. 24, in the action history search system, a narrowing-down model sharing device 90 that includes a narrowing-down model sharing DB (database) 91 is connected with the plurality of action history search devices 50 through a network. For example, the network includes a LAN (local area network), an intranet, an Ethernet (a registered trademark), the Internet, or the like. The narrowing-down model sharing device 90 acquires from the plurality of action history search devices 50 the narrowing-down models related to users of the action history search devices 50; and stores a shared narrowing-down model shared between the plurality of action history search devices 50 in the narrowing-down model sharing DB 91. Each of the plurality of action history search devices 50 further includes a shared narrowing-down model storage unit 73 in addition to an inquiry processing unit 60, a clock 61, a decision unit 62, a calculation unit 63, a judgment unit 64, an output unit 65, an action history storage unit 67, a POI information storage unit 68, a narrowing-down model storage unit 69, a narrowing-down model correction unit 66, and a schedule information storage unit 71.

The narrowing-down model storage unit 69 stores the narrowing-down model corresponding to the individual user of the action history search device 50. The shared narrowing-down model storage unit 73 stores the shared narrowing-down model acquired from the narrowing-down model sharing device 90 by the judgment unit 64.

When the inquiry probability is judged on the response candidate to the inquiry, the judgment unit 64 requests the narrowing-down model sharing device 90 to transmit the shared narrowing-down model corresponding to the target of inquiry output from the inquiry processing unit 60. When the shared narrowing-down model is received from the narrowing-down model sharing device 90, the judgment unit 64 stores the received narrowing-down model in the shared narrowing-down model storage unit 73. Then, the judgment unit 64 judges the user's inquiry probability on the response candidate to the inquiry using the action history statistics information output from the calculation unit 63, the narrowing-down model corresponding to the target of inquiry output from the inquiry processing unit 60 among the narrowing-down models stored in the narrowing-down model storage unit 69, and the shared narrowing-down model stored in the shared narrowing-down model storage unit 73; and outputs search result information representing the response candidate having the high inquiry probability as the search result. A description will be made in connection with how to use the narrowing-down model and the shared narrowing-down model. A method of using the two models in parallel includes a method of always using any one narrowing-down model for narrowing down the search result by exclusively using the narrowing-down model or the shared narrowing-down model through the judgment unit 64 and a method of using the narrowing-down model and the shared narrowing-down model at the same time. In the method of the latter, for example, appropriate weighting coefficients w1 and w2 (w1+w2=1) are assigned to the narrowing-down model and the shared narrowing-down model in advance. Then, the judgment unit 64 calculates a value of the user's inquiry probability using the narrowing-down model and the shared narrowing-down model, respectively. At this time, the sum of values obtained by multiplying the two narrowing-down models by the respective weighting coefficients is calculated as a final value of the inquiry probability. As the value increases, the response candidate is regarded as being high in the inquiry probability. As the search result, output is search result information representing the response candidate in which the value of the inquiry probability is a predetermined value or more.

Similarly to the first embodiment, the narrowing-down model correction unit 66 corrects the narrowing-down model stored in the narrowing-down model storage unit 69 in response to the user's operation input performed through the operation unit 56 on the response output from the output unit 65. In the present embodiment, the narrowing-down model correction unit 66 transmits the corrected narrowing-down model to the narrowing-down model sharing device 90 through the network and updates the shared narrowing-down model stored in the narrowing-down model sharing DB 91. When the narrowing-down model sharing device 90 updates the shared narrowing-down model stored in the narrowing-down model sharing DB 91, unlike when the action history search device 50 updates the narrowing-down model stored in the narrowing-down model storage unit 69, it is undesirable to directly reflect correction performed in response to the individual user's operation input on the shared narrowing-down model. This is because the shared narrowing-down model shared between a plurality of user on the network may be strongly influenced by a specific user's action when correction performed in response to the individual user's operation input has been reflected on the shared narrowing-down model. For this reason, it is preferable to reflect correction so that influence of correction performed in response to the individual user's operation input can be reduced as much as possible. For example, if the narrowing-down model corresponding to the individual user of each of the plurality of action history search devices 50 is one illustrated in FIG. 11, it is preferable to update the shared narrowing-down model so that an average value can be represented for each threshold value with respect to all or some of threshold values represented by the narrowing-down models related to all users. Specifically, for example, when the corrected narrowing-down model is received from the action history search device 50 through the network, the narrowing-down model sharing device 90 calculates averages of all or some of threshold values represented by the narrowing-down model and all or some of threshold values represented by the shared narrowing-down model stored in the narrowing-down model sharing DB 91 for each threshold value; and updates the shared narrowing-down model so that the calculated average values are set as new threshold values. Alternatively, the narrowing-down model sharing device 90 may store the narrowing-down models transmitted from the plurality of action history search devices 50 in association with the action history search devices 50, respectively; generate the shared narrowing-down model using the narrowing-down models; and store the generated shared narrowing-down model in the narrowing-down model sharing DB 91. Then, when the corrected narrowing-down model is transmitted from a certain action history search device 50, the shared narrowing-down model may be generated using the corresponding narrowing-down model and the narrowing-down models stored in association with the other action history search devices 50; and the shared narrowing-down model stored in the narrowing-down model sharing DB 91 may be updated to the generated shared narrowing model.

Figure 25:
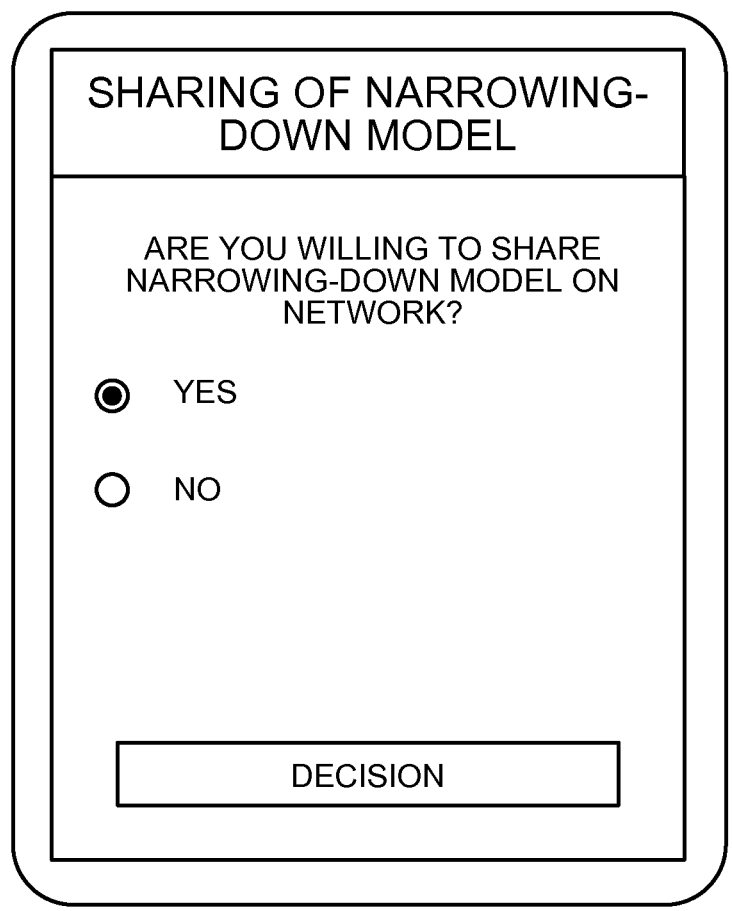
FIG. 25 is a diagram illustrating a display screen related to selection as to whether or not a narrowing-down model is to share.

Incidentally, sharing of the narrowing-down model is performed neither forcibly nor autonomously. For example, the action history search device 50 displays a display screen of allowing the user to select whether or not the narrowing-down model is to share through the network on the display unit 55 as illustrated in FIG. 25; and transmits the narrowing-down model stored in the narrowing-down model storage unit 69 through the network in response to an operation input performed through the operation unit 56 by the user who performs selection. Thus, in the narrowing-down model sharing device 90, the corresponding narrowing-down model is received; and so the shared narrowing-down model stored in the narrowing-down model sharing DB 91 is updated as described above.

Figure 26:
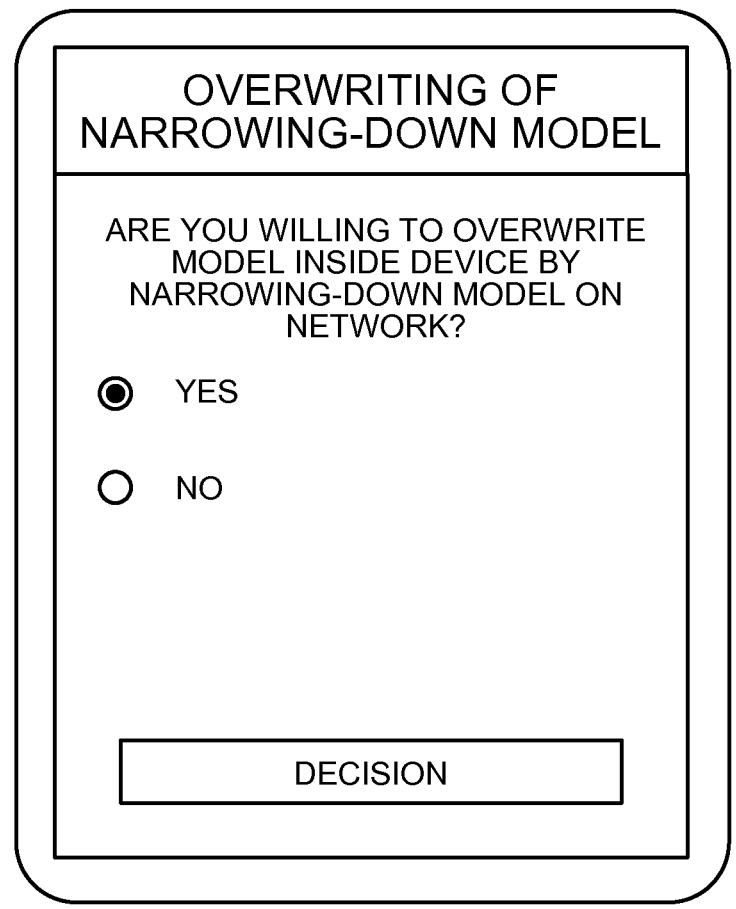
FIG. 26 is a diagram illustrating a display screen related to selection as to whether or not a narrowing-down model is to overwrite.

Furthermore, the action history search device 50 may overwrite the narrowing-down model stored in the narrowing-down model storage unit 69 using the shared narrowing-down model. Overwriting of the narrowing-down model by the shared narrowing-down model is performed neither forcibly nor autonomously. For example, the action history search device 50 displays a display screen of allowing the user to select whether or not the narrowing-down model is to overwrite on the display unit 55 as illustrated in FIG. 26; and performs overwriting by rewriting the narrowing-down model stored in the narrowing-down model storage unit 69 using the shared narrowing-down model acquired from the narrowing-down model sharing device 90 in response to an operation input performed through the operation unit 56 by the user who performs selection.

A procedure of an action history search process performed by the action history search device 50 according to the present embodiment is substantially the same as in FIG. 5, and thus a detailed description thereof will be not be repeated. In the present embodiment, in step S6, through the function of the judgment unit 64, the action history search device 50 acquires the shared narrowing-down model from the narrowing-down model sharing device 90; stores the acquired shared narrowing-down model in the shared narrowing-down model storage unit 73; and judges the user's inquiry probability on the response candidate to the inquiry using the action history statistics information output in step S5, the narrowing-down model corresponding to the target of inquiry output in step S2 among the narrowing-down models stored in the narrowing-down model storage unit 69, and the shared narrowing-down model stored in the shared narrowing-down model storage unit 73. In step S10, through the function of the narrowing-down model correction unit 66, the action history search device 50 corrects the narrowing-down model stored in the narrowing-down model storage unit 69; and further displays a display screen of allowing the user to select whether or not the narrowing-down model is to share through the network on the display unit 55. Then, when the operation input of sharing the narrowing-down model is received through the operation unit 56 through the network, the action history search device 50 transmits the corrected narrowing-down model to the narrowing-down model sharing device 90 through the network and updates the shared narrowing-down model stored in the narrowing-down model sharing DB 91.

According to this configuration, for example, it is possible to respond to a request of a user who does not want to open a pattern of history of his/her inquiry or history of his/her action to public on the network. As for the user of the action history search device 50 expected to store the narrowing-down model greatly different from one stored in the narrowing-down model sharing DB 91 due to the reason of aging or a health problem, the narrowing-down model corresponding to the user stored in the narrowing-down model storage unit 69 is preferentially used; and so it is possible to prevent the shared narrowing-down model stored in the narrowing-down model sharing DB 91 from being peculiarly inclined.

According to the present embodiment, for example, the user who has used the action history search device 50 for a short time can use the narrowing-down model constructed by other people as the shared narrowing-down model and narrow down the search result (the response candidate to the inquiry) based on his/her action history information. Furthermore, even though it is difficult to sufficiently narrow down the search result only by his/her own narrowing-down model on the inquiry made by the user, by using the narrowing-down model of another user as the shared narrowing-down model, it is possible to obtain the search result meaningful to the user in a form in which the noise is sufficiently reduced.

In the above described embodiments, various programs executed by the action history search device 50 may be configured to be stored in a computer connected to a network such as the Internet and provided by downloading through the network. The various programs may be files having an installable format or an executable format; and may be provided as a computer program product recorded on a computer readable recording medium such as a CD-ROM (compact disc read only memory), a FD (flexible disk), a CD-R (compact disc rewritable), and a DVD (digital versatile disk).

In the above described embodiments, the personal name has been exemplarily described as the target of inquiry, but the target of inquiry is not limited thereto. For example, a name of a place or a name of an object may be used as the target of inquiry. Further, the action history statistics information is not limited to the above example but preferably represents various statistical results according to the target of inquiry. For example, when the target of inquiry is a name of an object, through the function of the decision unit 62, the action history search device 50 decides the type of action stating that the object has been used as the range of the action history information (the search target); calculates an accumulated time in which the object has been used at least statistically; and outputs action history statistics information representing the statistical result. When the target of inquiry is a name of a place, through the function of the decision unit 62, the action history search device 50 decides the type of action stating having gone out as the range of the action history information (the search target); calculates an average sojourn time in a place outside home at least statistically; and outputs action history statistics information representing the statistical result. It is possible to calculate a statistical result effective as an index for measuring how well the user remembers an object or a place, and, as a result, it is possible to present the response meaningful to the user.

In the above described embodiments, the action history search device 50 may implement recognition of a person having a personal name which is the target of inquiry through image recognition. In this case, for example, the action history search device 50 further includes an image capturing unit that captures an image and stores image data representing, for example, an image of a face of a person having a personal name, corresponding to the personal name. The action history search device 50 performs a search on the image data representing an image that is identical or similar to, for example, an image of a face of a person captured by the image capturing unit through image recognition. In this case, for example, it is considered that it is unnecessary to narrow down the range of the search target using the user profile information or the schedule information described in the second embodiment. However, for example, in the case of a reunion, since a face may change due to the elapse of a long time or action history information representing history of an action conducted after graduation may be present in the action history storage unit 67, when the user is meeting with a person having a face similar to a person having a personal name (an original response), the action history search device 50 may possibly recognize that the image of the latter person is similar to, for example, an image of a face of a person captured by the image capturing unit. However, the action history search device 50 narrows down the range of the search target using the user profile information and the schedule information so that a person met during the time period in which the user has been enrolled in the high school can be obtained as the response candidate. Thus, even when the image data representing the image of the person (the response candidate) is searched by image recognition, it is possible to more reliably narrow down the response candidate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An action history search device, comprising:
   an inquiry processing unit that receives an inquiry from a user and outputs an inquiry time, at which the inquiry is received, and a target of inquiry;
   a decision unit that decides a range for searching action history information, which represents history of the user's action together with a time of the user's action, using the target of inquiry;
   a calculation unit that calculates an elapsed time from the time of user's action, which is represented by the action history information within the range, to the inquiry time;
   a judgment unit that judges, using the elapsed time and a narrowing-down model, a probability on each response candidate to the inquiry based on the history of the action represented by the action history information within the range, the narrowing-down model being used for judging according to the elapsed time the probability that the response candidate to the inquiry, which is obtained from the history of the action represented by the action history information, is the user's desired response; and
   an output unit that outputs the response candidate according to the probability.

2. The device according to claim 1, wherein the calculation unit further calculates the frequency related to the action based on the history of the action represented by the action history information within the range, the narrowing-down model judges the probability according to the elapsed time and the frequency, and the judgment unit judges the probability using the elapsed time, the frequency, and the narrowing-down model.

3. The device according to claim 2, wherein the action history information represents the history of the action including a place at which the action has been conducted, and the calculation unit calculates the frequency including the frequency related to the action at the place based on the history of the action represented by the action history information within the range.

4. The device according to claim 3, wherein the calculation unit calculates the frequency including the frequency related to the action at the place using the action history information within the range and schedule information that represents a schedule of the user's action together with a date, a time and a place.

5. The device according to claim 1, wherein the output unit outputs the response candidate and a judgment criterion used when the judgment unit judges the probability on the response candidate.

6. The device according to claim 1, further comprising an estimation unit that estimates the user's state using at least one of schedule information that represents a schedule of the user's action together with a date, a time and a place, profile information that represents the user's profile, and measurement information measured by a sensor transmitted the measurement information to the action history search device, wherein the decision unit decides the range using the target of inquiry and the state.

7. The device according to claim 1, further comprising a storage unit that stores a first narrowing-down model corresponding to an individual user, wherein the judgment unit judges the probability using the elapsed time and the first narrowing-down model.

8. The device according to claim 7, further comprising a correction unit that corrects the first narrowing-down model to increase the probability on a response in response to the user's operation input for determining the response among the response candidates.

9. The device according to claim 8, further comprising an acquisition unit that acquires a third narrowing-down model in which a second narrowing-down model corresponding to another user is reflected, wherein the judgment unit judges the probability using the elapsed time and at least one of the first narrowing-down model and the third narrowing-down model.

10. The device according to claim 9, wherein the acquisition unit acquires the third narrowing-down model from an information processing device that stores the third narrowing-down model through a network.

\* \* \* \* \*